United States Patent
Beigi et al.

(10) Patent No.: US 11,763,093 B2
(45) Date of Patent: Sep. 19, 2023

(54) SYSTEMS AND METHODS FOR A PRIVACY PRESERVING TEXT REPRESENTATION LEARNING FRAMEWORK

(71) Applicants: Ghazaleh Beigi, Tempe, AZ (US); Kai Shu, Mesa, AZ (US); Ruocheng Guo, Sichuan (CN); Suhang Wang, Mesa, AZ (US); Huan Liu, Tempe, AZ (US)

(72) Inventors: Ghazaleh Beigi, Tempe, AZ (US); Kai Shu, Mesa, AZ (US); Ruocheng Guo, Sichuan (CN); Suhang Wang, Mesa, AZ (US); Huan Liu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 328 days.

(21) Appl. No.: 17/245,774

(22) Filed: Apr. 30, 2021

(65) Prior Publication Data
US 2021/0342546 A1  Nov. 4, 2021

Related U.S. Application Data

(60) Provisional application No. 63/018,287, filed on Apr. 30, 2020.

(51) Int. Cl.
| G06F 40/30 | (2020.01) |
| G06F 21/62 | (2013.01) |
| G06N 3/08 | (2023.01) |
| G06F 40/211 | (2020.01) |
| G06F 18/2132 | (2023.01) |

(52) U.S. Cl.
CPC ........ *G06F 40/30* (2020.01); *G06F 18/21322* (2023.01); *G06F 21/6245* (2013.01); *G06F 40/211* (2020.01); *G06N 3/08* (2013.01); *G06F 18/21326* (2023.01)

(58) Field of Classification Search
CPC .............. G06F 40/30; G06F 18/21322; G06F 21/6245; G06F 40/211; G06F 18/21326; G06N 3/08
See application file for complete search history.

(56) References Cited

U.S. PATENT DOCUMENTS

2017/0293892 A1* 10/2017 Kenthapadi ........ G06Q 10/1053
2022/0207369 A1*  6/2022 Kato ....................... G06F 18/22

OTHER PUBLICATIONS

Dwork et al. (The Algorithmic Foundations of Differential Privacy) (Year: 2014).*
Bies et al., English web treebank, Linguistic Data Consortium, Philadelphia, PA (2012).
Boyd et al., Convex optimization, Cambridge university press. 2004.
Dwork, et al., The algorithmic foundations of differential privacy Foundations and Trends in Theoretical Computer Science (2014).
(Continued)

Primary Examiner — Michelle M Koeth
Assistant Examiner — Darioush Agahi
(74) Attorney, Agent, or Firm — POLSINELLI PC

(57) ABSTRACT

Various embodiments of a computer-implemented system which learns textual representations while filtering out potentially personally identifying data and retaining semantic meaning within the textual representations are disclosed herein.

18 Claims, 11 Drawing Sheets

(56) References Cited

OTHER PUBLICATIONS

Hakkini-Tur et al., Sanitization and anonymization of document repositories, Web and information security, IGI Global, 133-148. 2006.

Anandan et al., t-Plausibility: Generalizing Words to Desensitize Text, Transactions on Data Privacy 5, 3 (2012), 505-534.

Barbaro et al., A face is exposed for AOL searcher No. 4417749, New York Times 9, 2008, (2006), 8.

Beigi et al., I Am Not What I Write: Privacy Preserving Text Representation Learning. arXiv preprint arXiv:1907.03189, 2019.

Beigi et al., Privacy in social media: Identification, miti-gation and applications. arXiv preprint arXiv:1808.02191, 2018.

Beigi et al., Privacy preserving text representation learning, Proceedings of the 30th ACM Conference on Hypertext and Social Media, ACM, 275-276. 2019.

Beigi et al., Protecting user privacy: An approach for untraceable web browsing history and unambiguous user profiles, Proceedings of the Twelfth ACM International Conference on Web Search and Data Mining, ACM, 213-221, 2019.

Beretta et al., An interactive method for inferring demographic attributes in Twitter, Proceedings of the 26th ACM Conference on Hypertext & Social Media. ACM. 2015.

Bowman et al., Generating sentences from a continuous space, arXiv preprint arXiv:1511.06349 (2015).

Brants, TnT: a statistical part-of-speech tagger, Proceedings of the sixth conference on Applied natural language processing, ACL, 224-231. 2000.

Chaudhuri et al., Differentially private empirical risk minimization, JMLR, vol. 12. 2011.

Cho et al., Learning phrase representations using RNN encoder-decoder for statistical machine translation. arXiv preprint arXiv:1406.1078, 2014.

dos Santos et al., Deep convolutional neural networks for sentiment analysis of short texts, Proceedings of Computational Linguistics. 2014.

Dwork, Differential privacy: A survey of results, International Conference on Theory and Applications of Models of Computation. Springer, 1-19. 2008.

Fung et al., Privacy-preserving data publishing: A survey of recent developments, Comput. Surveys 42, 4 (2010).

Gervais et al., Quantifying web-search privacy, Proceedings of ACM SIGSAC on CCS. 2014.

Goodfellow et al., Generative adversarial nets, Advances in neural information processing systems. 2672-2680. 2014.

Gotz et al., Publishing search logs a comparative study of privacy guarantees, IEEE Transactions on Knowledge and Data Engineering 24, 3 (2012).

Hitaj et al., Deep models under the GAN: information leakage from collaborative deep learning, Proceedings ofACM SIGSAC Conference on Computerand Communications Security, 2017.

Hovy et al., Tagging performance correlates with author age, Proceedings of ACL. 2015.

Hovy et al., User review sites as a resource for large-scale sociolinguistic studies, Proceedings of WWW, 2015.

Gadkari, How does Twitter make money: https://www.bbc.com/news/business-24397472. Accessed Nov. 7, 2013. [no date].

Howe et al., TrackMeNot: Resisting surveillance in web search, Lessons from the Identity trail: Anonymity, privacy, and identity in a networked society 23 (2009), 417-436. 2009.

Hua et al., Differentially Private Matrix Factorization, IJCAI. 1763-1770, 2015.

Jones et al., I know what you did last summer: query logs and user privacy, Proceedings of the sixteenth ACM conference on Conference on information and knowledge management. ACM. 2007.

Jorgensen et al., Learning a POS tagger for AAVE-like language, Proceedings of ACL: Human Language Technologies. 2016.

Kifer et al., No free lunch in data privacy, Proceedings of ACM SIGMOD International Conference on Management of data. 2011.

Kingma et al., Auto-encoding variational bayes, arXiv preprint arXiv:1312.6114 (2013).

Korolova et al., Releasing search queries and clicks privately, WWW. 2009.

Le et al., Distributed representations of sentences and documents, International Conference on Machine Learning. 1188-1196. 2014.

Li et al., Towards Robust and Privacy-preserving Text Representations, Proceedings of Annual meeting of the Association for Computational Linguistics, 2018.

Lui et al., langid.py: An off-the-shelf language identification tool, Proceedings of the ACL 2012 systems demonstrations. 2012.

McSherry et al., Differentially private recommender systems: building privacy into the Netflix Prize contenders, Proceedings of the 15th ACM SIGKDD. 2009.

Meng, et al., Personalized privacy-preserving social recommendation, Proceedings of Thirty-Second AAAI Conference on Artificial Intelligence. 2018.

Mukherjee et al., Improving gender classification of blog authors, Proceedings of the 2010 conference on ACL EMNLP. 2010.

Narayanan et al., Robust de-anonymization of large sparse datasets, IEEE Symposium on Security and Privacy. 2008.

Petrov et al., A Universal Part-of-Speech Tagset, Proceedings of Language Resources and Evaluation (LREC). 2012.

Potthast et al., Overview of PAN'17, International Conference of the Cross-Language Evaluation Forum for European Languages. 2017.

Sala et al., Sharing graphs using differentially private graph models, Proceedings ofACM SIGCOMM on Internet measurement conference. 2011.

Shang et al., Neural responding machine for short-text conversation, arXiv preprint arXiv:1503.02364. 2015.

Volkova et al., Inferring Latent User Properties from Texts Published in Social Media, Proceedings of Twenty-Ninth AAAI Conference on Artificial Intelligence. 2015.

Wang et al., Preserving differential privacy in degree-correlation based graph generation, Transactions on data privacy 6, 2 (2013), 127. 2013.

Wang, et al., Location privacy-preserving task allocation for mobile crowdsensing with differential geo-obfuscation, Proceedings of the 26th International Conference on World Wide Web, International World Wide Web Conferences Steering Committee, 627-636. 2017.

Xiao et al., Differentially private network data release via structural inference, Proceedings of the 20th ACM SIGKDD. 2014.

Zhang et al., Anonymizing query logs by differential privacy, Proceedings of ACM SIGIR. 2016.

Zhu et al., Differential privacy for neighborhood-based collaborative filtering, Proceedings of ASONAM. ACM, 752-759. 2013.

\* cited by examiner

SYSTEMS AND METHODS FOR A PRIVACY PRESERVING TEXT REPRESENTATION LEARNING FRAMEWORK

CROSS-REFERENCE TO RELATED APPLICATIONS

This is a non-provisional application that claims benefit to U.S. Provisional Patent Application Ser. No. 63/018,287 filed Apr. 30, 2020, which is herein incorporated by reference in its entirety.

GOVERNMENT SUPPORT

This invention was made with government support under W911NF-15-1-0328 awarded by the Army Research Office, under 1614576 awarded by the National Science Foundation and under N00014-17-1-2605 awarded by the Office of Naval Research. The government has certain rights in the invention.

FIELD

The present disclosure generally relates to natural language processing; and in particular, to a computer-implemented system and method for learning textual representations of user-generated textual information which preserves semantic meaning while removing potential personal information.

BACKGROUND

Textual information is one of the most significant portions of data that users generate by participating in different online activities such as leaving online reviews and posting tweets. On one hand, textual data includes abundant information about users' behavior, preferences and needs, which is critical for understanding them. For example, textual data has been historically used by service providers to track users' responses to products and provide the user with personalized services. On the other hand, publishing intact user-generated textual data makes users vulnerable against privacy issues. The reason is that the textual data itself includes sufficient information that causes the re-identification of users in the textual database and the leakage of their private attribute information.

These privacy concerns mandate data publishers to protect users' privacy by anonymizing the data before sharing it. However, traditional privacy preserving techniques such as k-anonymity and differential privacy are inefficient for user-generated textual data because this data is highly unstructured, noisy and unlike traditional documental content, can include large amounts of short and informal posts. Moreover, these solutions may impose a significant utility loss for protecting textual data as they may not explicitly include utility into their design objectives. It is thus challenging to design effective anonymization techniques for user-generated textual data which preserve both privacy and utility.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
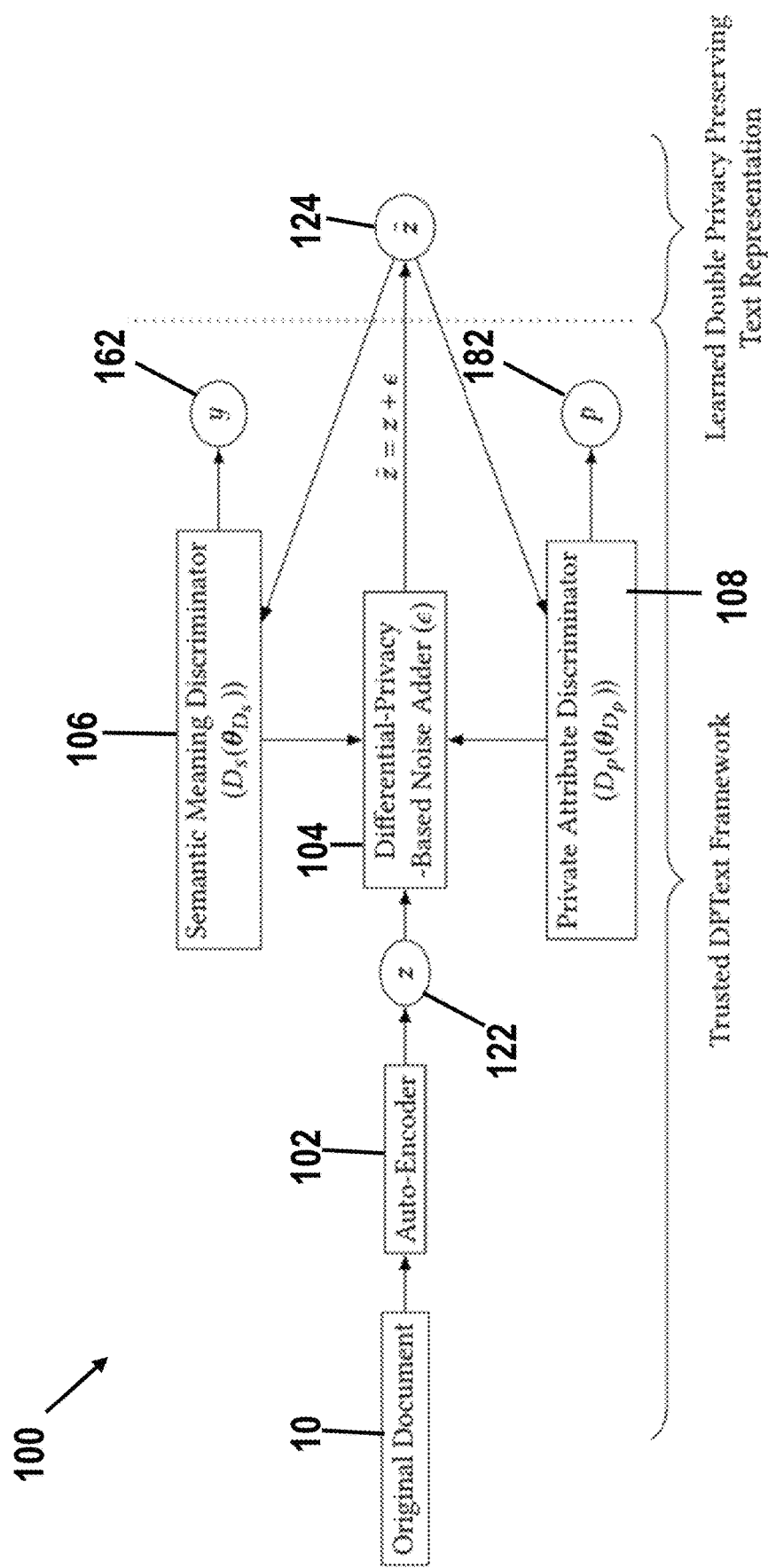
FIG. 1 is a block diagram showing an architecture for a computer-implemented text representation learning system.

Various embodiments of a framework for learning text representations of a document while maximizing semantic meaning and minimizing private attributes within text representations are disclosed herein. In some embodiments, the framework includes an auto-encoder for learning a text representation of a document, a differential-privacy-based noise adder for adding noise to the text representation, and semantic and private attribute discriminators to optimize the differential-privacy-based noise adder to ensure that semantic meaning is retained by the text representation while obfuscating private attributes. Referring to the drawings, embodiments of the system are illustrated and generally indicated as 100 in FIGS. 1-8.

Figure 2:
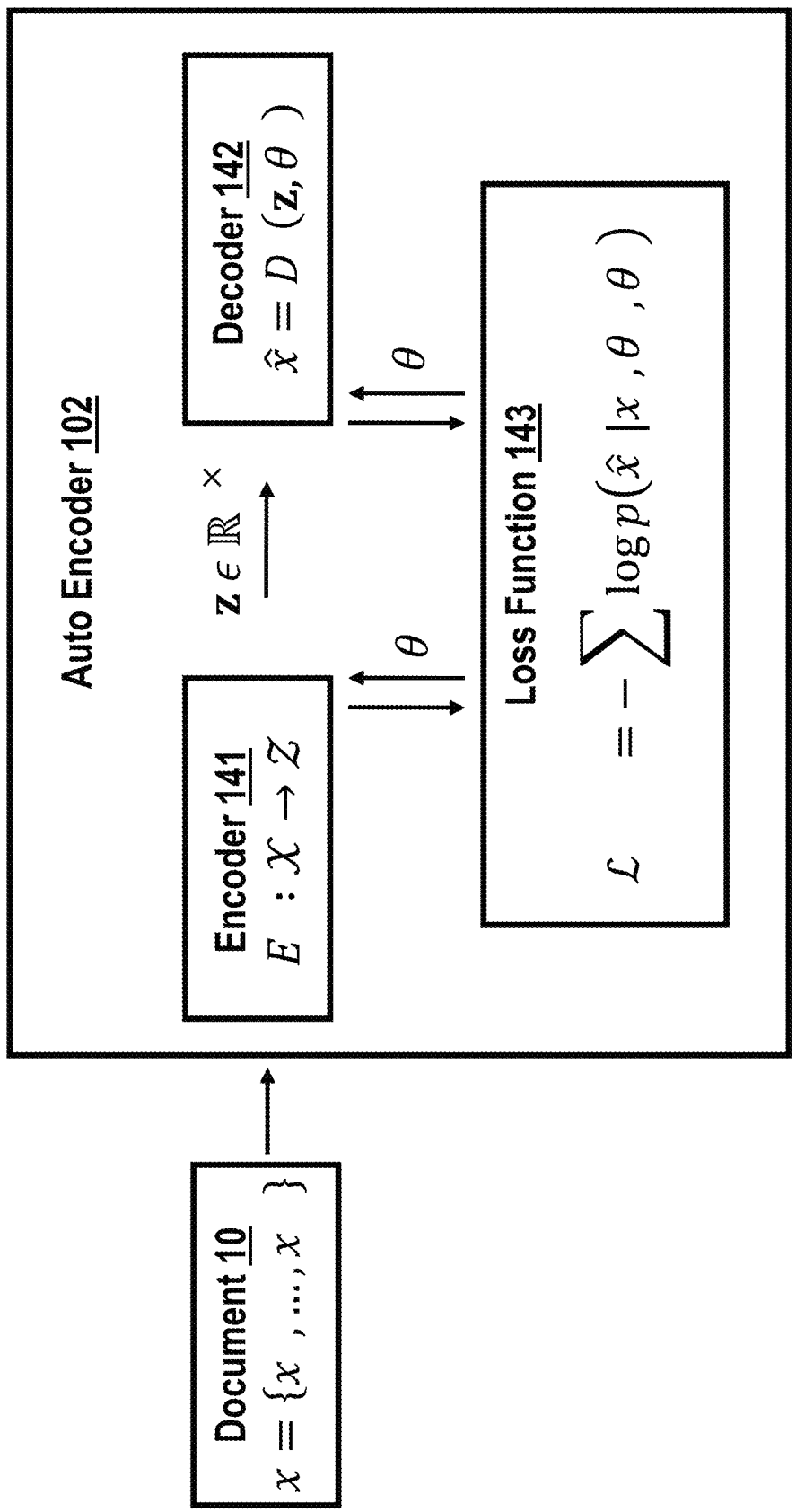
FIG. 2 is a block diagram showing an auto-encoder of the system of FIG. 1.
Figure 3:
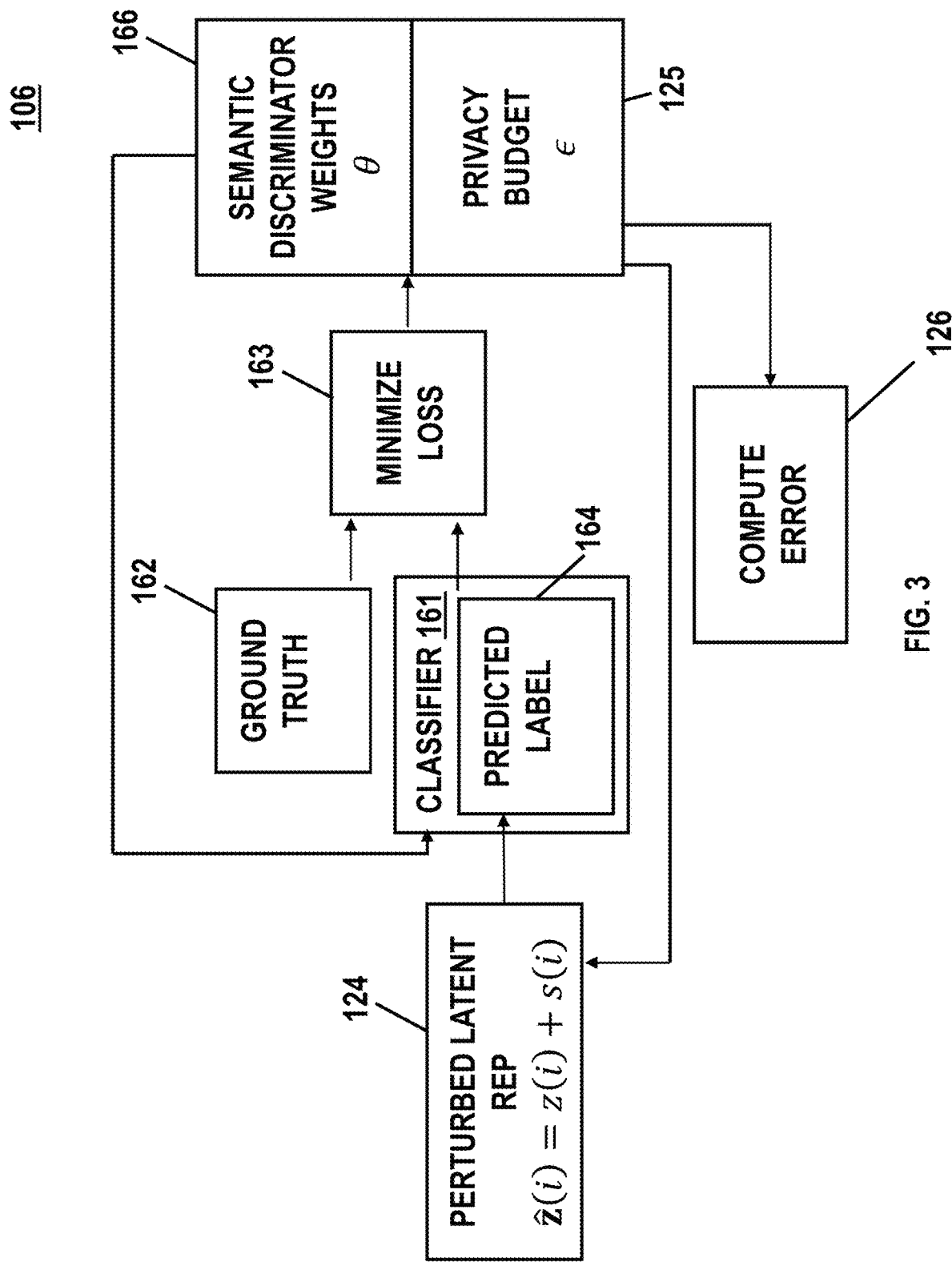
FIG. 3 is a block diagram showing a semantic discriminator of the system of FIG. 1.
Figure 4:
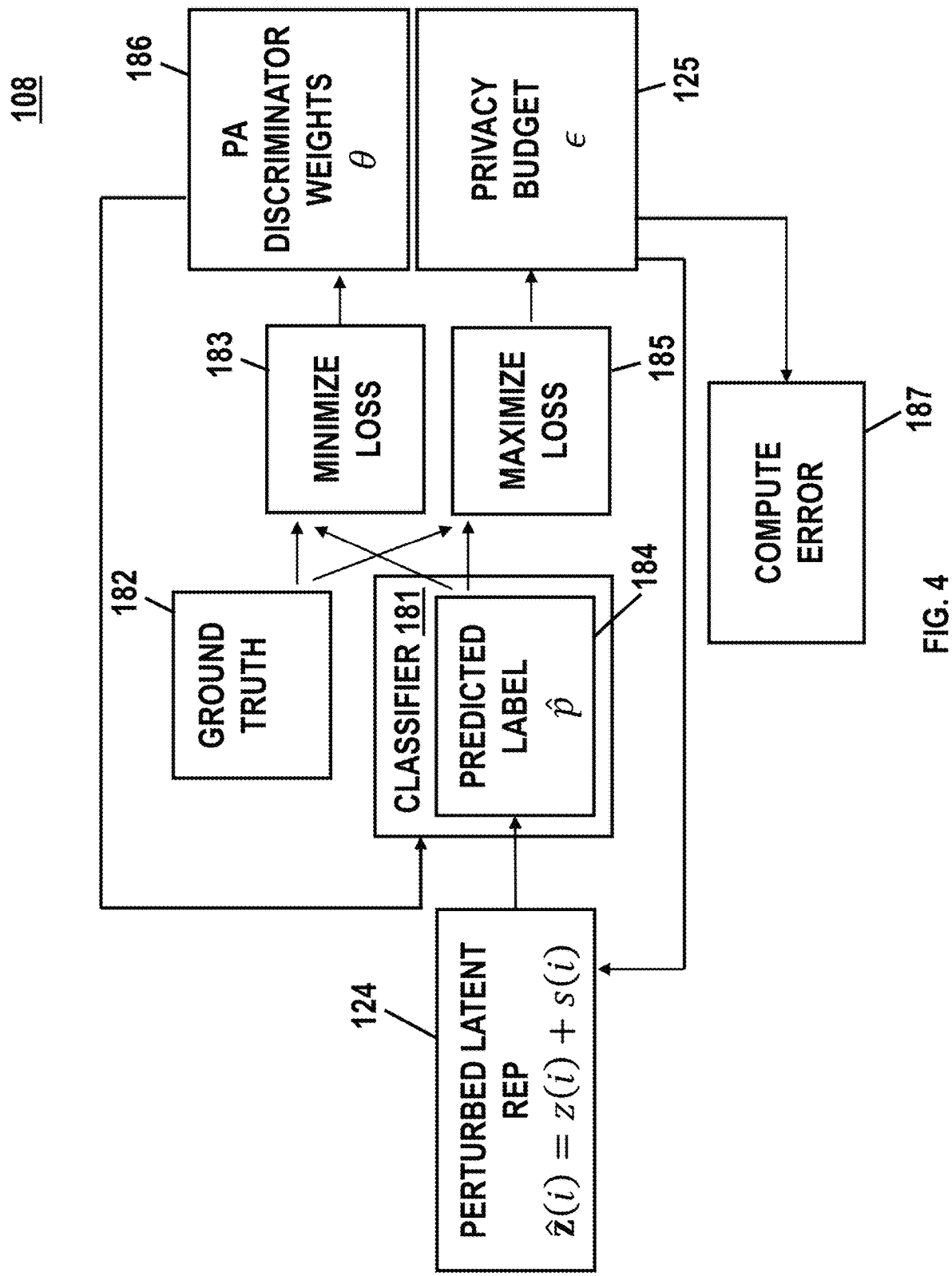
FIG. 4 is a block diagram showing a private attribute discriminator of the system of FIG. 1.
Figure 5:
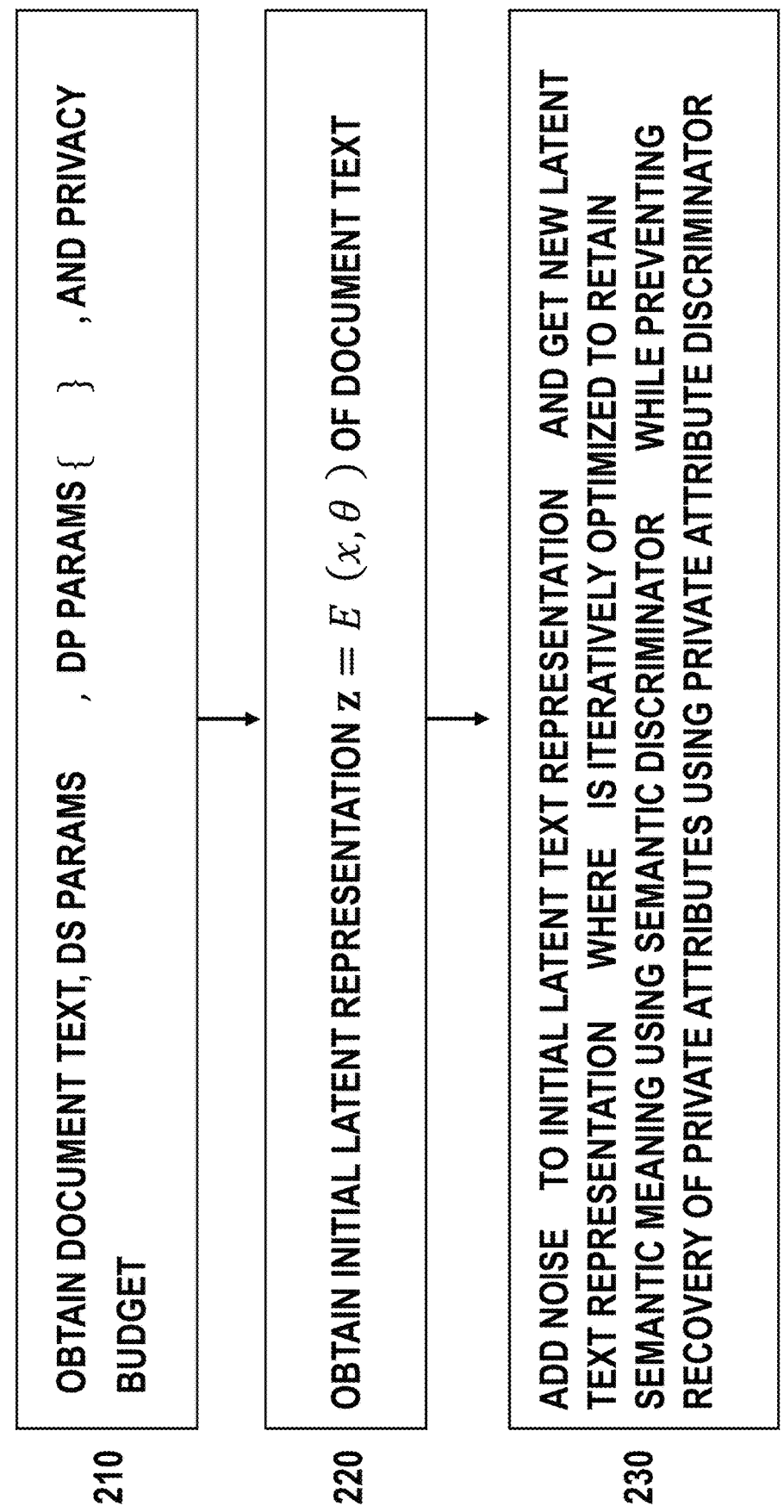
FIG. 5 is a flowchart showing a process flow for optimizing the text representation learning system of FIG. 1.
Figure 6:
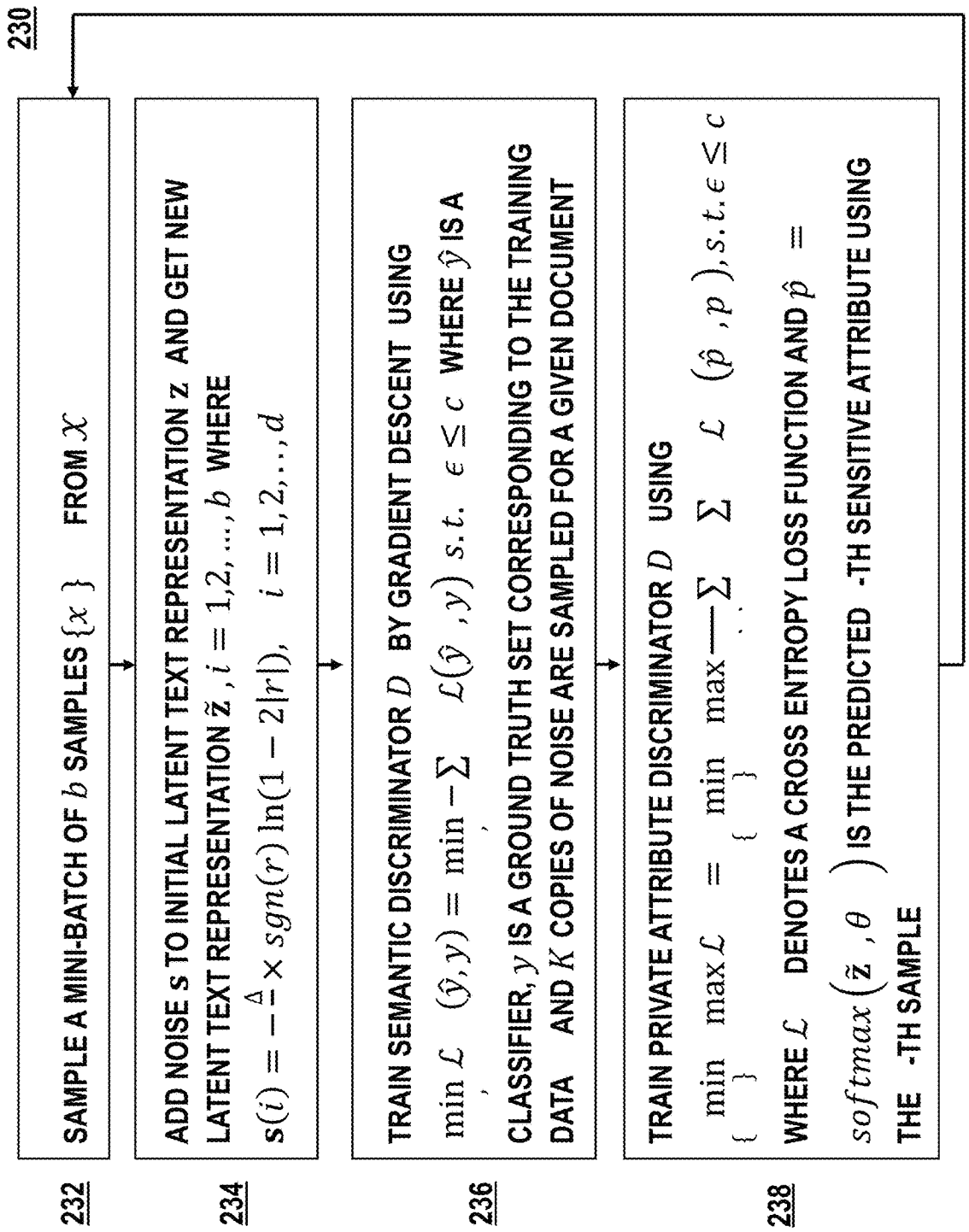
FIG. 6 is a flowchart showing a process flow for iteratively training the system of FIG. 1 to learn an amount of noise to add to a text representation.
Figure 7A:
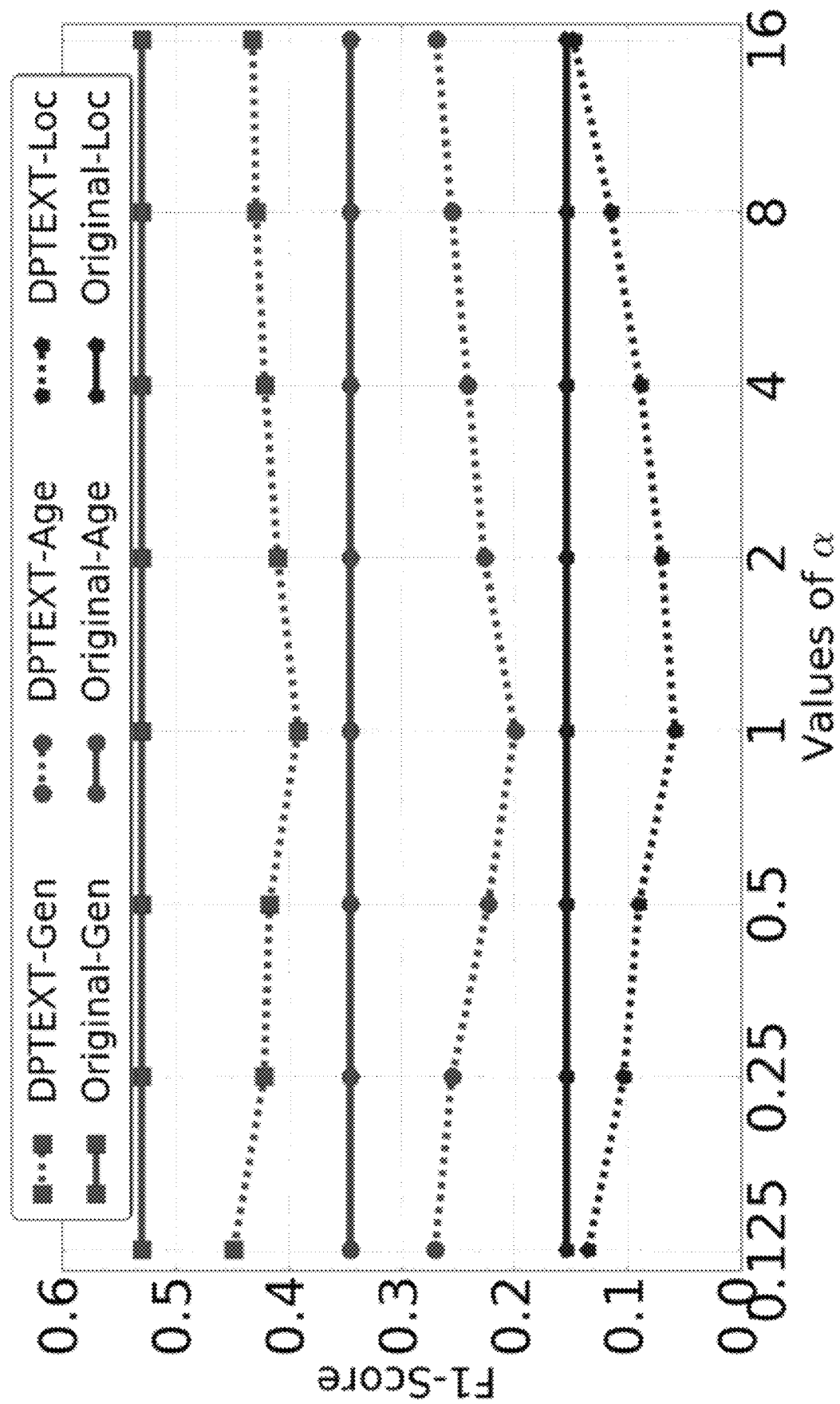
FIG. 7A is a graph showing private attribute prediction with respect to sentiment prediction (F1) for different contribution values of a private attribute discriminator of the text representation learning system of FIG. 1.
Figure 7B:
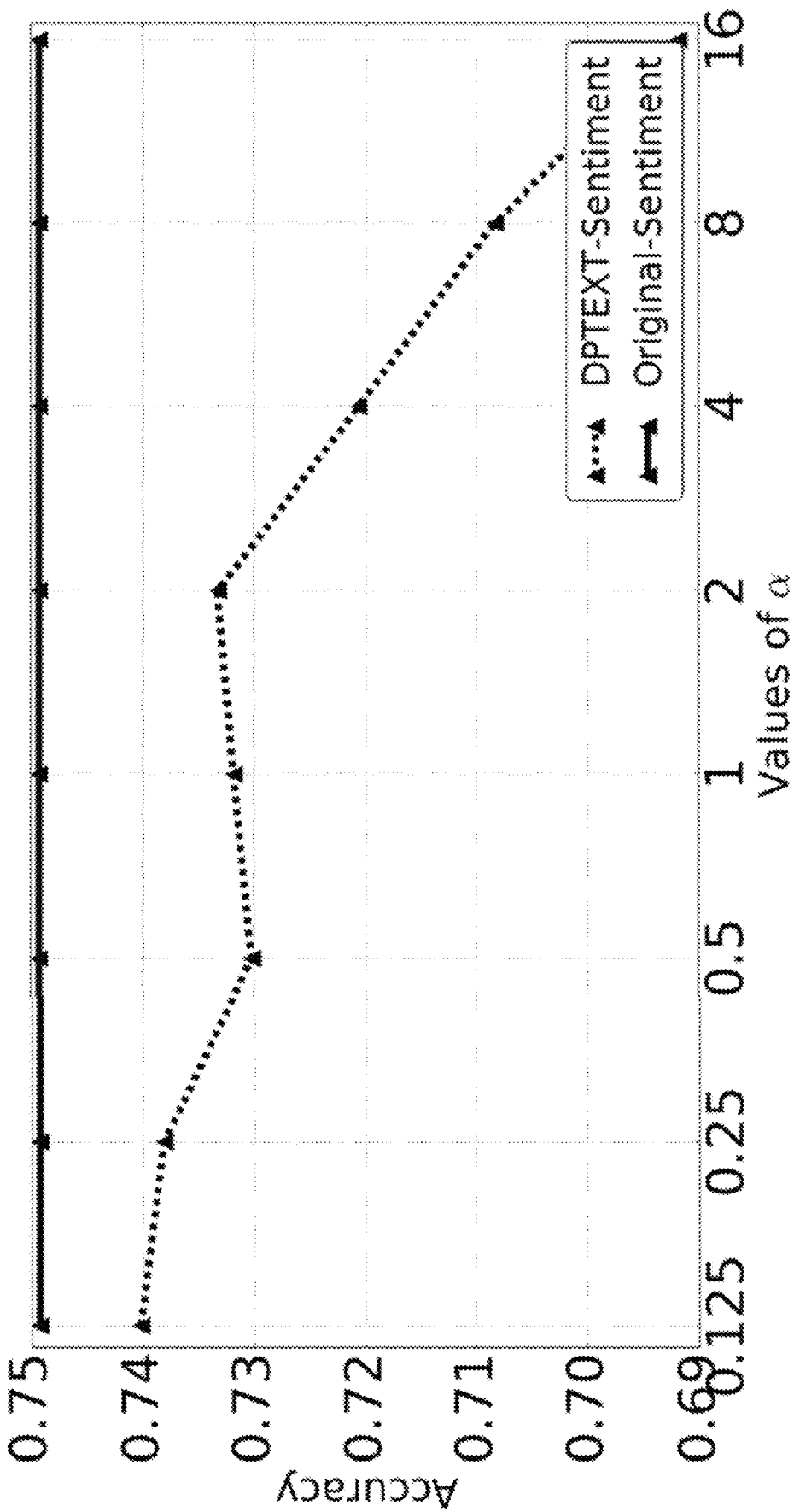
FIG. 7B is a graph showing sentiment prediction accuracy for different contribution values of a private attribute discriminator of the text representation learning system of FIG. 1.
Figure 7C:
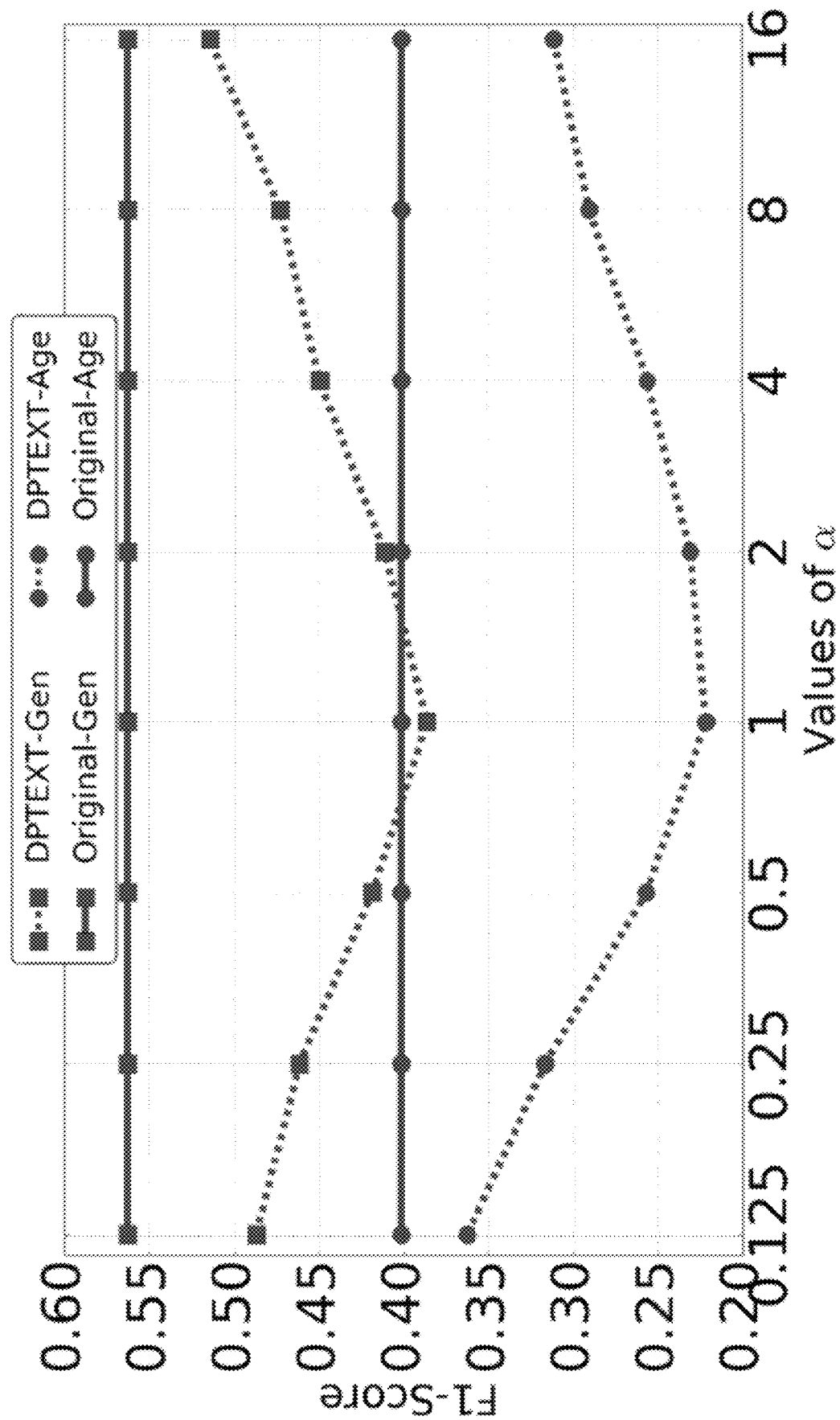
FIG. 7C is a graphical representation showing private attribute prediction with respect to part-of-speech tagging for different contribution values of a private attribute discriminator of the text representation learning system of FIG. 1.
Figure 7D:
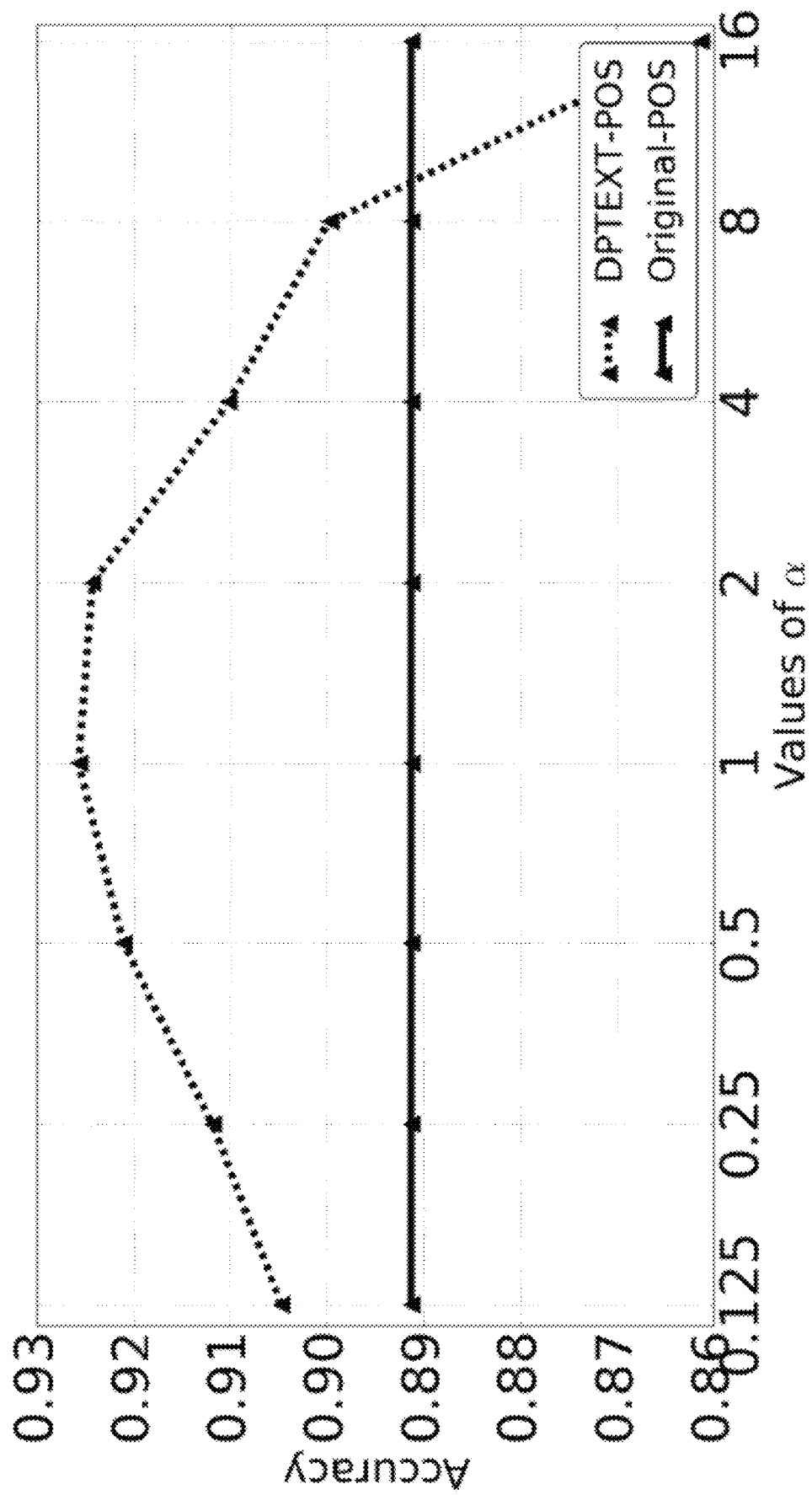
FIG. 7D is a graphical representation showing part-of-speech tagging accuracy for different contribution values of a private attribute discriminator of the text representation learning system of FIG. 1.

Referring to FIGS. 1-4, a double privacy preserving text representation learning framework 100, also referred to as DPText, is disclosed herein. The framework 100 learns a modified latent representation 124 for a document 10 that (1) is differentially private and thus protects users against leakage of their identity, (2) obscures users' private information (e.g., age, location, gender), and (3) retains high utility and semantic meaning for a given task. The present framework 100 includes four main components, 1) an auto-encoder 102 (FIG. 2), 2) differential-privacy-based noise adder 104, 3) a semantic meaning discriminator 106 (FIG. 3), and 4) a private attribute discriminator 108 (FIG. 4). It is further theoretically shown herein that a resultant modified latent representation 124 is differentially private. The effectiveness of the present framework 100 is also shown on real-world datasets in two important natural language processing tasks, i.e., sentiment prediction and part-of-speech (POS) tagging. The theoretical and empirical results show the effectiveness of DPText in minimizing chances of learned textual representation re-identification, obscuring private attribute information and preserving semantic meaning of the text.

Referring to FIG. 1, a document 10 can include textual information for analysis by the framework 100. The framework 100 includes an auto-encoder 102 configured to extract an initial latent representation z 122 for the document 10. The auto-encoder 102 extracts the initial latent representation z 122 and further minimizes a reconstruction error between the initial latent representation z 122 and the textual information within the document 10 itself. Once the initial latent representation z 122 is obtained, a differential privacy adder 104 is deployed along with associated semantic meaning discriminators 106 and private attribute discriminator 108 to add random noise, i.e., Laplacian noise, to the initial latent representation 122 with respect to a given privacy budget, denoted herein as $\epsilon$.

If one were to publish a text representation without proper anonymization, an adversary can learn the original text or infer if a targeted user's latent textual representation is in the database or which record is associated with it. Besides guaranteeing differential privacy, the act of adding noise minimizes the chance of the text re-identification and original text recovery. However, simply adding noise to the initial latent representation z 122 not only may destroy the semantic meaning of the text, but also does not necessarily prevent leakage of private attribute information from the text information on its own. Semantic meaning of the text data is task-dependent. For example, for sentiment analysis, sentiment is one of the semantic meanings of the given text and sentiment prediction is a classification task. Private-attribute information is also another important aspect of user privacy and includes information that the user does not want to disclose such as age, gender, and location.

It is therefore necessary to add an optimal amount of noise s to the original latent representation z 122. This challenge is approached by learning an amount of the added noise s using the privacy budget $\epsilon$. As shown, the semantic meaning discriminator $D_S$ 106 and the private attribute discriminator $D_P$ 108 are also utilized to infer the amount of noise s to be added to the original latent representation z 122 by differential privacy adder 104. The semantic meaning discriminator $D_S$ 106 ensures that the noise added by differential privacy adder 104 does not destroy the semantic meaning with respect to a given task. The private attribute discriminator $D_P$ 108 guides the amount of noise s added by differential privacy adder 104 by ensuring that a resultant modified latent representation 124 does not include users' private information.

To incorporate the two discriminators $D_S$ 106 and $D_P$ 108 into determining an optimal amount of noise, an objective function is modeled as a minmax game among the two introduced discriminators, $D_S$ 106 and $D_P$ 108. Assume that there are T private attributes in the document 10. Let $\theta_{D_P^t}$ and $\theta_{D_S}$ respectively demonstrate parameters of the private-attribute discriminator $D_P$ 108 and the semantic meaning discriminator $D_S$ 106. Correct labels for the t-th sensitive attribute and semantic classification task in the n-th document are also represented by $p_{n,t}$ and $y_n$, respectively. With N documents, an objective function is written as follows:

$$\min_{\theta_{D_S}, \epsilon, \{\theta_{D_P^t}\}_{t=1}^T} \max \frac{1}{N}\sum_{n=1}^{N} \mathcal{L}_{D_S}(\hat{y}_n, y_n) - \qquad (1)$$

$$\alpha \frac{1}{T}\sum_{t=1}^{T} \mathcal{L}_{D_P^t}(\hat{p}_{n,t}, p_{n,t}) + \lambda \Omega(\theta) \text{ s.t. } \epsilon \leq c_1$$

where $c_1$ is a predefined privacy budget constraint, $\mathcal{L}_{D_P^t}$ and $\mathcal{L}_{D_S}$ denote cross entropy loss function, $\hat{p}_t$ is a predicted t-th private attribute, $\hat{y}$ is a predicted semantic, and $\Omega(\theta)$ is a parameter regularizer. $\theta = \{\theta_{D_S}, \epsilon, \{\theta_{D_P^t}\}_{t=1}^T\}$ is a set of all parameters to be learned including parameters of the semantic meaning discriminator model $D_S$ 106 and private-attribute discriminator model $D_P$ 108 and the privacy budget $\epsilon$. Note that the resultant modified latent representation $\tilde{z}=z+\tilde{\epsilon}$ 124 satisfies $\tilde{\epsilon}$-differential privacy, where $\tilde{\epsilon} \leq c_1$ is an optimal learned budget.

Problem Statement

Let $\chi = \{x_1, \ldots, x_N\}$ denote a set of N documents and $\mathcal{P} = \{p_1, \ldots, p_N\}$ denotes a set of T private and sensitive attributes. Each document $x_i$ 10 includes a sequence of words, i.e., $x_i = \{x_i^1, \ldots x_i^m\}$. $z_i \in \mathbb{R}^{d \times 1}$ is denoted as the context representation 122 of the original document $x_i$ 10. The framework 100 aims to preserve users' privacy by preventing a potential adversary from inferring whether a target text representation is in the dataset or which record is associated with it or being able to learn the target users' private attribute information.

PROBLEM 1. Given a set of documents $\chi$, set of sensitive attributes $\mathcal{P}$, and given task T, learn a function f that can generate and release the modified latent representation $\tilde{z}_i$ 124 for each document $x_i$ so that, 1) the adversary cannot re-identify a targeted text representation and infer whether or not this latent representation is in the database, 2) the adversary cannot infer the targeted user's private attributes $\mathcal{P}$ from the modified latent representation $\tilde{z}_i$ 124 and 3) the modified latent representation $\tilde{z}_i$ 124 is good for the given task $\mathcal{T}$, i.e., $\tilde{z}_i = f(x_i, \mathcal{P}, \mathcal{T})$.

Differential Privacy Overview

Differential privacy protects a user's privacy during statistical query over a database by minimizing the chance of privacy leakage while maximizing the accuracy of queries. Differential privacy provides a strong privacy guarantee. The intuition behind differential privacy is that the risk of user's privacy leakage should not increase as a result of participating in a database. Differential privacy guarantees that existence of an instance in the database does not pose a threat to its privacy as the statistical information of data would not change significantly in comparison to the case that the instance is absent. This makes it challenging for an adversary to re-identify an instance and infer whether the instance is in the database or not or decide which record is associated with it. An algorithm with privacy property is denoted by $\mathcal{A}_p$, which is randomized so that the re-identification of the data on the adversary's side is very difficult. Differential privacy can be formally defined:

DEFINITION 1. $\epsilon$—Differential Privacy. An algorithm $\mathcal{A}_p$ is $\epsilon$-differential private if for any subset of outputs $\mathbb{R}$ and for all datasets $\mathcal{D}_1$ and $\mathcal{D}_2$ differing in at most one element:

$$\frac{\mathbb{P}(\mathcal{A}_p(\mathcal{D}_1) \in R)}{\mathbb{P}(\mathcal{A}_p(\mathcal{D}_2) \in R)} \leq e^\epsilon \qquad (2)$$

where $\mathcal{A}_p(\mathcal{D}_1)$ and $\mathcal{A}_p(\mathcal{D}_2)$ are the outputs of the algorithm for input datasets $\mathcal{D}_1$ and $\mathcal{D}_2$ respectively and $\mathbb{P}$ is the randomness of the noise in the algorithm Here $\epsilon$ is called privacy budget and it can be also shown that Eq. 2 is equivalent to $$\left|\log\left(\frac{P(\mathcal{A}_p(\mathcal{D}_1)=r)}{P(\mathcal{A}_p(\mathcal{D}_2)=r)}\right)\right| \le \epsilon$$

for some point r in the output range. Note that larger values of $\epsilon$ (e.g., 10) results in larger privacy loss while smaller values (e.g., $\epsilon \le 0.1$) indicate the opposite. For example, a small $\epsilon$ means that the output probabilities of $\mathcal{D}_1$ and $\mathcal{D}_2$ at r are very similar to each other which demonstrates more privacy. An uncertainty should be introduced in the output of a function (i.e., algorithm) to be able to hide the participation of an individual in the database. This is quantified by sensitivity, which is the amount of the change in the output of function $\mathcal{A}$ made by a single data point in the worst case Definition 2. $\mathcal{L}_1$-sensitivity. The $\mathcal{L}_1$-sensitivity of a vector-valued function $\mathcal{A}$ is the maximum change in the $\mathcal{L}_1$ norm of the value of the function $\mathcal{A}$ when one input changes. More formally, the $\mathcal{L}_1$-sensitivity $\Delta(\mathcal{A})$ if $\mathcal{A}$ is defined as $$\Delta(\mathcal{A}) = \max_{\substack{X,X' \\ |X,X'|=1}} \|\mathcal{A}(X) - \mathcal{A}(X')\|_1 \quad (3)$$

where $\chi$ and $\chi'$ are two datasets differ in one entry.

Framework Details and Construction

Referring again to FIGS. 1 and 2, the details of the double privacy preserving text representation learning framework 100 are discussed herein. This framework 100 includes four major components: 1) an auto-encoder 102 for text representation, 2) differential-privacy-based noise adder 104, 3) a semantic meaning discriminator 106, and 4) a private attribute discriminator 108. The auto-encoder 102 aims to learn a content representation z 122 of a document 10 by minimizing a reconstruction error between the latent representation z 122 and the text of the document 10. Then, the differential-privacy-based noise adder 104 adds random noise, i.e., Laplacian noise, to the initial latent representation z 122 with respect to privacy budget $\epsilon$ to further satisfy the differential privacy guarantee. Since adding noise neither guarantees semantic meaning preservation nor necessarily prevents leakage of private attributes, the semantic meaning and private attribute discriminators 106 and 108 are utilized to infer an optimal amount of added noise s. The semantic meaning discriminator $\mathcal{D}_S$ 106 ensures that the added noise does not destroy the semantic meaning with respect to a given task. The private attribute discriminator $\mathcal{D}_P$ 108 also guides the amount of added noise by ensuring that the manipulated representation does not include users' private information. Note that it is assumed that the framework 100 is trusted and therefore everything to the left of the privacy barrier (the red dashed line in FIG. 1) including the original textual information and intermediate results, are kept private. The final modified latent representation $\tilde{z}_i$ 124 which is to the right of the privacy barrier is released to the public. The final modified latent representation $\tilde{z}_i$ 124 1) is differentially private, 2) obscures private attribute information, and 3) preserves semantic meaning.

Content Representation Extraction

Referring to FIGS. 1 and 2, let $x=\{x^1, \ldots, x^m\}$ be a textual document 10 with m words where each word is from a fixed vocabulary set V with size $|v|=K$. The auto-encoder A 102 is used to extract content representation z 122 from document x 10. Let $E_A: \chi \to \mathcal{Z}$ be an encoder 141 that can infer the latent representation z 122 for a given document x 10, and $D_A: \mathcal{Z} \to \chi$ be a decoder that reconstructs the document 10 from its initial latent representation z 122.

Recurrent neural networks (RNNs) are effective for summarizing and learning semantics of unstructured noisy short texts. In one embodiment, an encoder 141 is built from a first RNN to learn the initial latent representation z 122 of texts. The encoder 141 can learn a probability distribution over a sequence when trained to predict the next symbol in a sequence. The encoder 141 includes a hidden state S and an optional output which operates on a word sequence $x=\{x^1, \ldots, x^m\}$. At each time step t, the hidden state $s_t$ of the encoder 141 is updated by:

$$s_t = f_{enc}(s_{t-1}, x^t). \quad (4)$$

After reaching the end of the given document 10, the last hidden state of the encoder 141 is used as the latent representation $z \in \mathbb{R}^{d \times 1}$ 122 of the document x 10. A gated recurrent unit (GRU) is used as the cell type to build the encoder 141, which is designed in a manner to have a more persistent memory. Let $\theta_e$ denote parameters for the encoder $E_A$ 141. Then:

$$z = E_A(x, \theta_e) \quad (5)$$

Decoder $\hat{x} = D_A(z, \theta_d)$ 142 serves as a check for encoder 141 and takes the initial latent representation z 122 found by encoder 141 as input to start the generation process. $\theta_d$ denotes parameters for the decoder $D_A$ 142, which is built using a second RNN. The decoder $D_A$ 142 generates an output word sequence $\hat{x}=\{\hat{x}^1, \ldots, \hat{x}^m\}$. At each time step t, a hidden state of the decoder 142 is computed as:

$$s_t = f_{dec}(s_{t-1}, \hat{x}^t) \quad (6)$$

where $s_0=z$. The word at step t is predicted using a softmax classifier:

$$\hat{x}^t = \text{softmax}(W^{(S)}s_t) \quad (7)$$

Where softmax(.) is a softmax activation function, $W^{(S)} \in \mathbb{R}^{|v| \times (d+k)}$ with d+k as the dimension of the hidden state in each layer, and $\hat{x}^t \in \mathbb{R}^{|v|}$ is a probability distribution over the vocabulary. Here V denotes a fixed vocabulary set with size $|v|=K$. $\hat{x}^{t,j}$ is defined as the probability of choosing j-th word $v_j \in V$ as:

$$\hat{x}^{t,j} = p(\hat{x}^t = v_j | \hat{x}^{t-1}, \hat{x}^{t-2}, \ldots, \hat{x}^1) \quad (8)$$

The probability of generating an output sequence $\hat{x}=\{\hat{x}^1, \ldots, \hat{x}^m\}$ given the input document x is:

$$p(\hat{x}|x, \theta_d) = \prod_{t=1}^{t=m} p(\hat{x}^t|\hat{x}^{t-1}, \hat{x}^{t-2}, \ldots, \hat{x}^1, z, \theta_d) \quad (9)$$

The encoder 141 and decoder 142 of the auto-encoder 102 of the framework 100 are jointly trained to minimize the negative conditional log-likelihood for all documents. A loss function 143 is defined as:

$$\mathcal{L}_{auto} = -\sum_{i=1}^{m} \log p(\hat{x}^i \mid x^i, \theta_d, \theta_e) \quad (10)$$

Where $\theta_e$ and $\theta_d$ are the set of model parameters for the encoder 141 and decoder 142, respectively. The trained auto-encoder $E_A$ 102 is used to obtain the content representation $z \in \mathbb{R}^{d \times 1}$ 122 according to Eq. 5 where d is the size of textual representation.

Adding Noise

Textual information is rich in content and publishing this data without proper anonymization lead to privacy breach and revealing the identity of an individual. This can let the adversary infer if a targeted user's latent textual representation is in the database or which record is associated with it. Moreover, publishing a document's latent representation could result in leakage of the original text. In fact, recent advancement in adversarial machine learning shows that it is possible to recover the input textual information from its latent representation. In this case, if an adversary has preliminary knowledge of the training model, they can readily reverse engineer the input, for example, by a GAN attack algorithm. It is thus essential to protect the textual information before publishing it.

The goal is thus to add noise to the initial latent representation z 122 such that the differential privacy condition is satisfied. In one embodiment, the initial latent representation z 122 is perturbed at noise adder 104 by adding Laplacian noise as follows:

$$\hat{z}(i) = z(i) + s(i) \sim Lap(b), b = \frac{\Delta}{\epsilon}, i = 1, \ldots, d \quad (11)$$

where $\epsilon$ is the privacy budget, $\Delta$ is the $L_1$-sensitivity of the latent latent representation z, d the dimension of z, s the noise vector, s(i) and z(i) are the i-th element for vectors s and z, respectively. $\Delta = 2d$. Note that each element of the noise vector is drawn from Laplacian distribution. The optimal privacy budget c is iteratively found using the semantic meaning discriminator $D_S$ 106 and the private attribute discriminator $D_P$ 108, and the process of adding noise s to the initial latent representation z 122 runs concurrently with finding the optimal privacy budget $\epsilon$ until an optimal modified latent representation 2122 is reached.

Preserving Semantic Meaning: Semantic Meaning Discriminator

Referring to FIGS. 1 and 3, perturbing the latent representation z 122 of the given text by adding noises to it (Eq. 11) prevents the adversary from reconstructing the text from its latent representation and guarantees differential privacy. However, this approach may destroy the semantic meaning of the text data. Semantic meaning is task-dependent, e.g., classification is one of the common tasks. In order to preserve the semantic meaning of the context 122 representation, it is necessary to add an optimal amount of noise to the latent representation 122 which does not destroy the semantic meaning of the text data while ensuring data privacy. The challenge is approached using the semantic discriminator 106 by learning an optimal amount of added noise s denoted by privacy budget $\epsilon$ 125 in terms of training a classifier 161:

$$\hat{y} = softmax(\hat{z}; \theta_{D_S}) \quad (12)$$

where $\theta_{D_S}$ 166 are weights associated with the softmax function and $\hat{y}$ represents an inferred label 164 for classification.

To preserve the semantic meaning of the text representation, a noisy latent representation is needed which retains high utility and accordingly includes enough information for a downstream task, e.g., classification. The classifier 161 of the semantic discriminator $D_S$ 106 is defined that aims to assign a correct class label to a modified latent representation $\hat{z}(i)$ 124, whose loss function 163 is minimized as follows, $$\min_{\theta_{D_S}, \epsilon} \mathcal{L}(\hat{y}, y) = \min_{\theta_{D_S}, \epsilon} \sum_{i=1}^{C} -y(i) \log \hat{y}(i) \quad (13)$$

where C is the number of classes, and $\mathcal{L}$ denotes the cross entropy loss function. A one-hot encoding of a ground truth 162 for the classification task is also denoted by y and y(i) represents the i-th element of y, i.e., the ground truth label for i-th class.

To learn the value of the privacy budget $\epsilon$ 125, a reparameterization process is employed. Instead of directly sampling noise s(i) from a Laplacian distribution (i.e., Eq. 11), this process first samples a value r from a uniform distribution, i.e. $r \sim [0,1]$, and then rewrites the amount of added noise s(i) as follows:

$$s(i) = -\frac{\Delta}{\epsilon} \times sgn(r) \ln(1 - 2|r|), i = 1, 2, \ldots, d \quad (14)$$

This is equivalent to sampling noise s from $$Lap\left(\frac{\Delta}{\epsilon}\right).$$

The advantage of doing so is that the parameter $\epsilon$ is now explicitly involved in the representation of the added noise, s, which makes it possible to use back-propagation to find the optimal value of $\epsilon$. Large privacy budget $\epsilon$ could result in large privacy bounds. Hence, a constraint, $\epsilon < c_1$ is added where $c_1$ is a predefined constraint.

Another challenge here is that $\hat{y}$ is inferred from $\hat{z}$ after introducing noise to the initial latent representation z. The noise is also sampled from the Laplacian distribution which results in large variance in the training process. To solve this issue and make the model more robust, K copies of noise are sampled for each given document. In other words, Eq. 13 can be re-written as follows:

$$\min_{\theta_{D_S}, \epsilon} \mathcal{L}_{D_S}(\hat{y}, y) = \quad (15)$$

$$\min_{\theta_{D_S}, \epsilon} \frac{1}{K} \sum_{k=1}^{K} \mathcal{L}(\hat{y}^k, y) = \min_{\theta_{D_S}, \epsilon} \frac{1}{K} \sum_{k=1}^{K} \sum_{i=1}^{C} -y(i) \log \hat{y}^k(i) \text{ s.t. } \epsilon \leq c_1$$

where the goal is to minimize loss function $\mathcal{L}_{D_S}$ w.r.t. the parameters $\{\theta_{D_S}, \epsilon\}$ and $\hat{y}^k = softmax(\hat{z}^k; \theta_{D_S})$. Note that $\hat{z}^k = z + s^k$ in which $s^k$ is the k-th sample of the noise calculated with Eq. 14.

Following minimization and resultant determination of a privacy budget $\in$ 125, an error 126 is computed between predicted label $\hat{y}$ 161 and ground truth label y 162.

Private Attribute Discriminator and Privacy Preservation

Referring to FIGS. 1 and 4, the disclosure further addresses how adding noise s to the latent representation z 122 of the text can prevent adversaries from learning the input textual information and guarantee differential privacy. Another important aspect of learning privacy preserving text representation is to ensure that sensitive and private information of the users such as age, gender, and location is not captured in the latent representation.

An adversary cannot design a private attribute inference attack better than what it has already anticipated. In this spirit, the idea of adversarial learning is leveraged. In particular, it is necessary to train the private attribute discriminator $D_p$ 108 to accurately identify the private information from the latent representation z 122, while learning the modified latent representation 2124 that can fool the discriminator and minimize leakage of private attributes, which results in a representation that does not contain sensitive information. Private attribute discriminator 108 uses a classifier 181 to attempt to predict a private attribute label 184 using a ground truth label 182. Ultimately, a goal of private attribute discriminator 108 would be to find parameters that would prevent any classifier such as classifier 181 from accurately predicting private attribute labels. Assume that there are T private attributes (e.g., age, gender, location). Let $p_t$ represent the ground truth 182 (i.e., correct label) for the t-th sensitive attribute and $\theta_{D_p^t}$ demonstrate parameters 186 of discriminator model $D_P$ 108 for the t-th sensitive attribute. The adversarial learning can be formally written as:

$$\min_{\{\theta_{D_P^t}\}_{t=1}^T} \max_{\epsilon} \mathcal{L}_{D_P} = \min_{\{\theta_{D_P^t}\}_{t=1}^T} \max_{\epsilon} \frac{1}{K.T.} \sum_{t=1}^T \sum_{k=1}^K \mathcal{L}_{D_P^t}(\hat{p}_P^k, p_t), \quad (16)$$

$$\text{s.t. } \epsilon \leq c_1$$

Where $\mathcal{L}_{D_p^t}$ denotes a cross entropy loss function and $\hat{p}_t^k = \text{softmax}(\tilde{z}^k, \theta_{D_p^t})$ is the predicted t-th sensitive attribute label 184 using the k-th sample. The outer minimization 183 finds the strongest private attribute inference attack and the inner maximization 185 seeks to fool the discriminator by obscuring private information. In other words, the outer minimization 183 seeks convergence of the discriminator parameters 186 while the outer maximization 185 seeks to find the privacy budget value $\in$ 125 to maximize a loss between a predicted label 184 of a private attribute and an actual ground truth label 182. The private attribute discriminator 108 finds parameters $\theta_{D_p^t}$ 186 and a privacy budget value $\in$ 125 that cause the classifier 181 to fail to classify private attributes. Following maximization and resultant determination of a privacy budget $\in$ 125, an error 187 is computed based on the predicted private attribute label $\hat{p}$ 184 and ground truth value 182 of the private attribute p.

Optimization Function

In the previous sections, it was discussed how to: (1) add noise to prevent the adversary from reconstructing the original text from the latent representation and minimize the chance of privacy breach by satisfying differential privacy (Eq. 11), (2) control the amount of the added noise to preserve the semantic meaning of the textual information for a given task (Eq. 15), and (3) control the amount of the added noise so that user's private information is masked (Eq. 16). Inspired by the idea of adversarial learning, all three are achieved at once by modeling the objective function as a minmax game among the semantic meaning discriminator $D_S$ 106 and the private attribute discriminator $D_P$ 108, as follows:

$$\min_{\theta_{D_S}, \epsilon} \max_{\{\theta_{D_P^t}\}_{t=1}^T} \mathcal{L}_{D_S} - \alpha \mathcal{L}_{D_P} = \quad (17)$$

$$\min_{\theta_{D_S}, \epsilon} \max_{\{\theta_{D_P^t}\}_{t=1}^T} \frac{1}{K} \sum_{k=1}^K \left[ \mathcal{L}(\hat{y}^k, y) - \alpha \frac{1}{T} \sum_{t=1}^T \mathcal{L}_{D_P^t}(\hat{p}_t^k, p_t) \right], \text{ s.t. } \epsilon \leq c_1$$

where $\alpha$ controls the contribution of the private attribute discriminator in the learning process. This objective function seeks to minimize privacy leakage with respect to the attack, minimize loss in the semantic meaning of the textual representation, and protect private information. With N documents, Eq. 13 is written as follows:

$$\min_{\theta_{D_S}, \epsilon} \max_{\{\theta_{D_P^t}\}_{t=1}^T} \frac{1}{N} \sum_{n=1}^N \left[ \frac{1}{K} \sum_{k=1}^K \left[ \mathcal{L}(\hat{y}_n^k, y_n) - \alpha \frac{1}{T} \sum_{t=1}^T \mathcal{L}_{D_P^t}(\hat{p}_n^k, p_{n,t}) \right] \right] + \quad (18)$$

$$\lambda \Omega(\theta), \text{ s.t. } \tilde{\epsilon} \leq c_1$$

Where $\theta = \{\theta_{D_S}, \in, \{\theta_{D_P^t}\}_{t=1}^T\}$ is the set of all parameters to be learned, $\Omega(\theta)$ is the regularizer for the parameters such as Frobenius norm and $\lambda$ is a scalar to control the amount of contribution of the regularization $\Omega(\theta)$ The aim of this objective function is to perturb the original text representation by adding a proper amount of noise to it in order to prevent an adversary from inferring existence of the target textual representation in the database, reconstructing the user's original text and learning user's sensitive information from the latent representation, while preserving the semantic meaning of the modified representation for a given specific task. It is stressed that the resultant text representation satisfies $\tilde{\epsilon}$-differential privacy, where $\tilde{\epsilon} \leq c_1$ is the optimal learned privacy budget. This is further discussed below.

---

Algorithm 1: The Learning Process of DPTEXT model

---

Input: Training data $\chi$, $\theta_{D_S}$, $\epsilon$, $\{\theta_{D_P^t}\}_{t=1}^T$, batch size b, $c_1$ and $\alpha$.
Output: The privacy preserving learned text representation $\tilde{z}$
1:  Pre-train the document auto-encoder $E_\alpha$ to obtain the text representations according to Eq. 5 as $z = E_A(x, \theta_e)$
2:  repeat
3:      Sample a mini-batch of b samples $\{x^i\}_{i=1}^b$ from $\chi$

| Algorithm 1: The Learning Process of DPTEXT model |
|---|
| 4:      Add noise s to initial document representation $z_i$ and get the new document representation $\tilde{z}_i$, i = 1,2,..., b via Eq. 14 |
| 5:      Train semantic discriminator $D_S$ by gradient descent (Eq. 15) |
| 6:      Train private attribute discriminator $D_P$ via Eq. 16. |
| 7: until Convergence |

The optimization process is illustrated in Algorithm 1 and FIGS. 1-5. Block 210 of process flow 200 shows obtaining $\theta_{D_S}$, $\epsilon$, $\{\theta_{D_P}{}^i\}_{i=1}^T$ and training data $\chi$. First, the initial latent representation 122 of all documents $\mathcal{Z} = \{z_i, \ldots, z_N\}$ is obtained in Line 1, as further illustrated in FIGS. 1 and 2 and as further shown in block 220 of FIG. 5. Then, as illustrated in lines 2-7 and as shown in block 230 of FIG. 5 and elaborated on in FIG. 6, noise s is added to the initial latent text representation $z_i$ 122 to obtain a new modified latent representation $\tilde{z}_i$ 124. s is iteratively optimized to retain semantic meaning using semantic discriminator $D_S$ 106 while preventing recovery of private attributes using private attribute discriminator $D_P$ 108. In particular, as shown in block 232 of FIG. 6, a mini-batch of b samples from the training data are sampled and in block 234, noise s is added to initial text representation 122. Next, the semantic discriminator $D_S$ 106 is trained in Line 5 at block 236 and private attribute discriminator $D_P$ 108 is trained in Line 6 at block 238. Recall that there is a constraint on the variable $\epsilon$, i.e., $\epsilon < c_1$. To satisfy this constraint, the idea of the projected gradient descent is used, wherein the gradient descent is performed in one step, i.e. $\epsilon \leftarrow \gamma \times \epsilon$ where $\gamma$ is the learning rate. Then, the parameter $\epsilon$ is projected back to the constraint. This means that if $\epsilon < c_1$, then set $\epsilon = c_1$, otherwise, keep the value of $\epsilon$. The modified latent representation $\tilde{z}_i$ 124 can be then calculated for each given document 10 according to the value of optimal learned privacy budget $\varsigma \leq c_1$ using Eq. 11. Note that any model can be used for semantic discriminator $D_S$ 106 and private attribute discriminator $D_P$ 108.

Theoretical Analysis

Here, it is shown that the learned text representation using DPText is $\tilde{\epsilon}$-differential privacy where $\tilde{\epsilon} \leq c_1$ is the learned optimal privacy budget. In particular, the privacy guarantee for the final noisy latent representation $\tilde{z}_i$ for each given document is proven. The theoretical findings confirm the fact that DPText minimizes the chance of revealing existence of textual representations in the database.

Theorem 1. Let $\tilde{\epsilon} \leq c_1$ be the optimal value learned for the privacy budget variable $\epsilon$ w.r.t the semantic meaning and private attribute discriminators. Let $z_i$ be the original latent representation for document $x_i$, i=1, ..., N inferred using Eq. 5 and. Moreover, let $\Delta$ denote the $L_1$-sensitivity of the textual latent representation extractor function discussed herein. If each element $s_i(l)$, l=1, ..., d in noise vector $s_i$ is selected randomly from $$Lap\left(\frac{\Delta}{\tilde{\epsilon}}\right)(\Delta = 2d),$$

the final noisy latent representation $\tilde{z}_i = z_i + s_i$ satisfies $\tilde{\epsilon}$-differential privacy Proof. First the change of z is bound when one data point in the database changes. This gives the $L_1$-sensitivity of the textual latent representation extractor function discussed above.

Recall the way z is calculated using Eq. 5. Function tanh is used in GRU to build the RNN which is used above to find the latent representation of a given document. The output of tanh function is within range $[-1,1]$. This indicates that value of each element $z(l)$, l=1, ..., d in the latent representation vector z is within range $[-1,1]$. If one data point changes (i.e., removed from the database), the maximum change in value of each element $z(l)$ is 2. Since the dimension of z is d, the maximum change in the $L_1$ norm of z happens when all of its elements, $z(l)$, have the maximum change. According to Definition. 2, the $L_1$-sensitivity of z is $\Delta = 2 \times d$.

Now, assume that $\tilde{\epsilon} \leq c_1$ is the optimal value for the learned privacy budget. Then each element in s (i.e., s(l), l=1, 2, ..., d) is distributed as $$Lap\left(\frac{\Delta}{\tilde{\epsilon}}\right)$$

based on Eq. 11 which is equal to randomly picking each s(l) from the $$Lap\frac{\Delta}{\tilde{\epsilon}}$$

distribution, whose probability density function is $$Pr(s(l)) = \frac{\tilde{\epsilon}}{2\Delta} e^{-\frac{\tilde{\epsilon}|s(l)|}{\Delta}}.$$

Let $\mathcal{D}_1$ and $\mathcal{D}_2$ be any two datasets only differ in the value of one record. Without loss of generality it is assumed that the representation of the last document is changed from $z_n$ to $z'_n$. Since the $L_1$-sensitivity of z is $\Delta = 2d$, then $\|z_n - z'_n\|_1 \leq \Delta$. Then:

$$\frac{Pr[z_n + s_n = r \mid \mathcal{D}_1]}{Pr[z'_n + s'_n = r \mid \mathcal{D}_2]} = \frac{\prod_{l \in \{1,2,\ldots,d\}} Pr(r - z_n(l))}{\prod_{l \in \{1,2,\ldots,d\}} Pr(r - z'_n(l))} = \quad (19)$$

$$\frac{\prod_{l \in \{1,2,\ldots,d\}} Pr(s_n(l))}{\prod_{l \in \{1,2,\ldots,d\}} Pr(s'_n(l))} = e^{-\frac{\tilde{\epsilon}\sum_l |s_n(l)|}{\Delta}} \bigg/ e^{-\frac{\tilde{\epsilon}\sum_l |s'_n(l)|}{\Delta}} =$$

$$e^{\frac{\tilde{\epsilon}\sum_l |s'_n(l)| - |s_n(l)|}{\Delta}} \leq e^{\frac{\tilde{\epsilon}\sum_l (|s'_n(l) - s_n(l)|)}{\Delta}} = e^{\frac{\tilde{\epsilon}\|s'_n - s_n\|_1}{\Delta}}$$

where $s_n$ and $s'_n$ are the corresponding noise vectors with respect to the learned $\tilde{\epsilon}$ when the input are $\mathcal{D}_1$ and $\mathcal{D}_2$, respectively. The first inequality also follows from the triangle inequality, i.e. $|a| - |b| \leq |a - b|$. The last equality follows from the definition of $L_1$-norm.

Since $s_n = r - z_n$ and $s'_n = r - z'_n$ then:

$$\|s'_n - s_n\|_1 = \|(r - z'_n) - (r - z_n)\|_1 = \|z'_n - z_n\|_1 \leq \Delta \quad (20)$$

This follows from the definition of L1-sensitivity. Eq. 19 is re-written:

$$\frac{Pr[z_n + s_n = r \mid \mathcal{D}_1]}{Pr[z'_n + s'_n = r \mid \mathcal{D}_2]} \leq e^{\frac{\tilde{\epsilon} \|s'_n - s_n\|_1}{\Delta}} \leq e^{\frac{\tilde{\epsilon} \Delta}{\Delta}} = e^{\tilde{\epsilon}} \quad (21)$$

So, the theorem follows and the final noisy latent representation is $\tilde{\epsilon}$-differentially private.

Experimental Results

In this section, experiments are conducted on real-world data to demonstrate the effectiveness of $DPT_{EXT}$ in terms of preserving both privacy of users and utility of the resultant representation for a given task. Specifically, this section aims to answer the following questions:

Q1—Utility: Does the learned text representation preserve the semantic meaning of the original text for a given task?

Q2—Privacy: Does the learned text representation obscure users' private information?

Q3—Utility-Privacy Relation: Does the improvement in privacy of learned text representation result in sacrificing the utility?

To answer the first question (Q1), experimental results for $DPT_{EXT}$ were reported with respect to two well-known text-related tasks, i.e., sentiment analysis and part-of-speech (POS) tagging. Sentiment analysis and POS tagging have many applications in Web and user-behavioral modeling. Recent research showed how linguistic features such as sentiment are highly correlated with users' demographic information. Another group of research shows the effectiveness of POS tags in predicting users' age and gender information. This makes users vulnerable against inference of their private information. Therefore, to answer the second question (Q2), different private information, i.e., age, location, and gender, and report results for private attribute prediction task are considered. To answer the third question (Q3), the utility loss is investigated against privacy improvement of the learned text representation Data. A dataset from TrustPilot is used. On TrustPilot, users can write reviews and leave a one to five star rating. Users can also provide some demographic information. In the collected dataset, each review is associated with three attributes, gender (male/female), age, and location (Denmark, Germany, France, United Kingdom, and United States). First, all non-English reviews based on LANG-ID.PY are discarded, and only reviews classified as English with a confidence greater than 0.9 are kept. Age attribute is categorized into three groups, over-45, under-35, and between 35 and 45. 10,000 reviews are subsampled for each location to balance the five locations. Each review's rating score is considered as the target sentiment class.

Model and Parameter Settings. For the document auto-encoder A, a single-layer RNN is used with GRU cell of input/hidden dimension with d=64. For semantic and private attribute discriminators, feed-forward networks are used with single hidden layer with the dimension of hidden state set as 200, and a sigmoid output layer, which is determined through grid search. The parameters $\alpha$ and $\lambda$ are determined through cross-validation, and are set as $\alpha=1$ and $\lambda=0.01$. The upper-bound constraint $c_1$ for the value of parameter $\epsilon$ is also set as $c_1=0.1$ to ensure the $\epsilon$-differential privacy, $\epsilon=0.1$ for the learned representation.

Part of Speech Tagging

Part-of-speech (POS) tagging is another language processing application which is framed as a sequence tagging problem.

Data. For this task a manually POS tagged version of TrustPilot dataset in English is used. This data is obtained and includes 600 sentences, each tagged with POS information based on a Google Universal POS tagset and also labeled with both gender and age of the users. The gender attribute is categorized into male and female, and age attribute is categorized into two groups over-45, under-35. Web English Tree-bank (WebEng) is used as a pre-training tagging model because of the small quantity of text available for this task. WebEng is similar to TrustPilot datasets with respect to the domain as both contains unedited user generated textual data Model and Parameter Settings. Similar to the sentiment analysis task, a single-layer RNN is used with GRU cell of input/hidden dimension with d=64 for document auto-encoder A 104. For semantic discriminator 106 (i.e., POS tag predictor), a bi-directional long short-term memory network is used:

$$h_i = LSTM(x^i, h_{i-1}; \theta_h), h'_i = LSTM(x^i, h'_{i+1}; \theta'_h)$$

$$y_i = \text{Categorical}(\phi([h_i; h'_i]); \theta_0) \quad (22)$$

Where $x^i|_{i=1}^m$ is the input sequence with m words, $h_i$ is the i-th hidden state, $h_0$ and $h'_{m+1}$ are terminal hidden states set to zero, [.;] denotes vectors concatenation and $\phi$ is a linear transformation. The dimension of the hidden layer is set as 200. A dropout rate of 0.5 is applied to all hidden layers during training For the private attribute discriminator 108, feed-forward networks are used with single hidden layer with the dimension of hidden state set as 200, and a sigmoid output layer (determined via grid search). The input to this network is final hidden representation $[h_m; h'_0]$. For hyperparameters, values of $\alpha$ and $\lambda$ are set as $\alpha=1$ and $\lambda=0.01$ which are determined through cross-validation. The upper-bound constraint for the value of E is also set as $c_1=0.1$.

Experimental Design

Ten-fold cross validation was performed for POS tagging and sentiment analysis tasks. State-of-the-art research is followed and accuracy score reported to evaluate the utility of the generated data for the given POS tagging or sentiment analysis task. In particular, for the sentiment prediction task, accuracy was reported for correctly predicting rating of reviews. Tagging accuracy for POS tagging task was also reported. To examine the text representation in terms of obscuring private attributes, test performance was reported in terms of F1 score for predicting private attributes. Note that the private attributes for sentiment task include age, gender and location while private attributes for tagging task include gender and age.

DPText is reported in both tasks with the following baselines:

ORIGINAL: This is a variant of DPText and publishes the original representation z 122 without adding noise or utilizing $D_S$ discriminator 106 or $D_P$ discriminator 108.

DIFPRIV: This baseline adds Laplacian noise to the original representation z 122 according to Eq. 11

$$\left(\text{i.e., } Lap\left(\frac{\Delta}{\epsilon}\right), \epsilon = 0.1, \Delta = 2d\right)$$

without utilizing $D_S$ and $D_P$ discriminators 106 and 108. Note that this method makes the final representation e-differentially private. The model was compared against this method to investigate the effectiveness of semantic and private attribute discriminators 106 and 108.

ADV-ALL: This method utilizes the idea of adversarial learning and has two components, generator, discriminator. It generates a text representation that has high quality for the given task but has poor quality for inference of private attributes. The model was compared against this method to see how well adding optimal value of noise can preserve privacy in practice In both tasks, semantic discriminator $D_S$ 106 is trained on the training data and applied to test data for predicting sentiment and POS tags. Similarly, private attribute discriminator $D_P$ 108 can be applied where it plays the role of an adversary trying to infer the private attributes of the user based on the textual representation. Private attribute discriminator $D_P$ 108 is also trained on the training data and applied to test data for evaluation. Higher accuracy score for semantic discriminator $D_S$ 106 indicates that representation has high utility for the given task, while lower F1 score for private attribute discriminator $D_P$ 108 demonstrates that the textual representation has higher privacy for individuals due to obscuring their private information Experimental Results Performance Comparison. For evaluating the quality of the learned text representation, questions Q1, Q2 and Q3 are answered for two different natural language processing tasks, i.e., sentiment prediction and POS tagging. The experimental results for different methods are demonstrated in Table 1.

TABLE 1

Accuracy for sentiment prediction and POS tagging and F1 for evaluating private attribute prediction task.

(a) Sentiment Prediction Task

| Model | Sentiment (Acc) | Private Attribute (F1) | | |
|---|---|---|---|---|
| | | Age | Loc | Gen |
| ORIGINAL | 0.7493 | 0.3449 | 0.1539 | 0.5301 |
| DIFPRIV | 0.7397 | 0.3177 | 0.1411 | 0.5118 |
| ADV-ALL | 0.7165 | 0.3076 | 0.1080 | 0.4716 |
| DPTEXT | 0.7318 | 0.1994 | 0.0581 | 0.3911 |

(b) POS Tagging Task

| Model | POS Tagging (Acc) | Private Attribute (F1) | |
|---|---|---|---|
| | | Age | Gen |
| ORIGINAL | 0.8913 | 0.4018 | 0.5627 |
| DIFPRIV | 0.8982 | 0.3911 | 0.5417 |
| ADV-ALL | 0.8901 | 0.3514 | 0.5008 |
| DPTEXT | 0.9257 | 0.2218 | 0.3865 |

Utility (Q1):

Sentiment Prediction Task. The results of sentiment prediction for $DPT_{EXT}$ is comparable to the ORIGINAL approach. This means that the representation by $DPT_{EXT}$ preserves the semantic meaning of the textual representation according to the given task (i.e., high utility). DIFPRIv performs slightly better than $DPT_{EXT}$ in preserving semantic meaning of the text. The reason is that DPText applies noise at least as strong as DIFPRIV (or even more) and adding more noise results in bigger utility loss. Despite of adding more noise than DIFPRIV, the accuracy of $DPT_{EXT}$ is still comparable with DIFPRIV. This confirms the role of semantic meaning discriminator $D_S$ in preserving utility and semantic meaning as it explicitly takes utility into consideration when adding noise. It is also observed that $DPT_{EXT}$ has better performance in terms of predicting sentiment in comparison to AD V-ALL. $DPT_{EXT}$ is different from AD V-ALL as it manipulates the original text representation by adding noise to it while AD V-ALL generates a privacy preserving text representation from scratch. The benefit of $DPT_{EXT}$ over AD V-ALL is two-fold. First, the framework does not depend on the process which generates the original representation. In other words, this representation could be generated via any model such as doc2vec. Second, adding Laplacian noise to the text representation prevents adversary from learning the original input text through reverse engineering by a GAN attack algorithm and also minimizes re-identification of users by guaranteeing $\in$-differential privacy POS Tagging Task. The accuracy of POS tagging task is higher when DPText is utilized rather than when ORIGINAL is used. This is because POS tagging results are biased toward gender, age and location. In other words, this information affects the performance of tagging task. Removing private information from the latent representation results in removing this type of bias for tagging task. Therefore, the learned representation is more robust and results in a more accurate tagging. DPText also has better performance than DIFPRIV due to removal of private information and thus bias. Besides, results demonstrate that DPText outperforms ADV-ALL. These results indicate the effectiveness of DPText in preserving semantic meaning of the learned text representation Privacy (Q2):

Sentiment Prediction Task. In the sentiment prediction task, DPTEXT has significantly lower F1 score for inferring all three private attributes in comparison to ORIGINAL. This shows that DPTEXT outputs text representations that outperforms ORIGINAL in terms of obscuring private information. Moreover, it was also observed that DPTEXT has significantly better performance in hiding private information than DIFPRIV. This indicates that solely adding noise and satisfying $\epsilon$-differential privacy does not protect textual information against other types of attacks and leakage of users' private attributes. This further demonstrates the importance of private attribute discriminator DP in obscuring users' private information. It is also observed that the learned textual representation via DPTEXT hides more private information than AD V-ALL (lower F1 score). These results indicate that DPTEXT can successfully obscure private information POS Tagging Task. In the POS tagging task, F1 scores of DPText for predicting gender and age private attributes are significantly lower than ORIGINAL approach. These results demonstrate the effectiveness of DPText in obscuring users' private attribute. Similarly, comparing F1 scores of DPText and DIFPRIV shows that the final text representation output of DPText contains less private attribute information. This confirms the incapability of DIFPRIV in obscuring users' private information, and clearly shows the effectiveness of private attribute discriminator DP. This confirms that satisfying differential privacy does not necessarily protect against other types of attacks such as leakage of users' private attributes. Moreover, DPText outperforms AD V-ALL method in terms of hiding user's age and gender information. It confirms that the learned textual latent representation by DPText preserves privacy by eliminating their sensitive information with respect to the POS tagging task.

Utility-Privacy Relation (Q3):

Sentiment Prediction Task. For the sentiment prediction task, DPText has achieved the highest accuracy and thus reached the highest utility in comparison to other methods. It also has comparable utility results to ORIGINAL. However, ORIGINAL utility is preserved at the expense of significant privacy loss. In other words, ORIGINAL is not able to obscure users' private attribute information. Moreover, although DIFPRIV satisfies differential privacy and its performance is comparable with DPText for predicting sentiment, it performs poorly in obscuring private information. DIFPRIV may provide weaker privacy guaranty comparing with DPText since learned E in DPText can be smaller than $\in=0.1$ in DIFPRIV. In contrast, DPText has significantly better (best) results in terms of privacy compared to the other approaches and also achieves the least utility loss in comparison to AD V-ALL. These results show that DPText not only protect users' privacy with respect to two different types of attacks, but also preserves semantic meaning of the given text with respect to to the task in hand.

POS Tagging Task. For the POS tagging task, the resultant representation from DPText achieves the highest utility in comparison to all other baselines. It also provides a more accurate tagging than ORIGINAL approach as it removes the bias from the textual representation by obscuring age and gender attributes information. Moreover, DPText has the lowest F1 scores for predicting age and gender attributes amongst all approaches meaning that it performs the best in obscuring users' private attributes information. These results show the effectiveness of DPText in preserving semantic meaning and obscuring private information for more accurate tagging.

The results for two natural language processing tasks indicate that DPText learns a textual representation that (1) does not contain private information, (2) guaranties differential privacy and thus protects users against leakage of their identity, and (2) preserves the semantic meaning of the representation for the given task.

Impact of Different Components. In this subsection, the impact of different private attribute discriminators on obscuring users' private information is investigated. To achieve this goal, three variants of the disclosed framework are explored, i.e., DPTEXTAGE, DPTEXTGEN, and DPTEXTLOC. In each of these variants, the model is trained with discriminator of just one of the private attributes. For example, DPTEXTAGE is trained solely with age discriminator and does not use any other private attribute discriminators during training phase. The performance comparisons for both sentiment prediction and POS tagging tasks are shown in Table 2.

TABLE 2

Impact of different private attribute discriminators on DPText for sentiment prediction and POS tagging tasks.

(a) Sentiment Prediction Task

| Model | Sentiment (Acc) | Private Attribute (F1) | | |
|---|---|---|---|---|
| | | Age | Loc | Gen |
| DPTEXT | 0.7318 | 0.1994 | 0.0581 | 0.3911 |
| DPTEXTAGE | 0.7573 | 0.2248 | 0.1012 | 0.3982 |
| DPTEXTLOC | 0.7360 | 0.2861 | 0.0731 | 0.4100 |
| DPTEXTGEN | 0.7347 | 0.2997 | 0.0623 | 0.4053 |

TABLE 2-continued

Impact of different private attribute discriminators on DPText for sentiment prediction and POS tagging tasks.

(b) POS Tagging Task

| Model | POS Tagging (Acc) | Private Attribute (F1) | |
|---|---|---|---|
| | | Age | Gen |
| DPTEXT | 0.9257 | 0.2218 | 0.3865 |
| DPTEXTAGE | 0.9218 | 0.2111 | 0.4179 |
| DPTEXTGEN | 0.9361 | 0.2412 | 0.3916 |

Sentiment Prediction Task. In sentiment prediction task, it is observed that using solely one of the private attribute discriminators can result in a representation which performs better in terms of sentiment prediction, in comparison to DPText in which all three private attributes discriminators are used (i.e., higher utility). This shows that obscuring all private attributes results in adding more noise and thus losing more of quality of resultant text representation. However, these variants perform poorly in terms of obscuring private attributes in comparison to the original DPText model. This shows that obscuring a specific private attribute can help with hiding information of other private attributes as well. This is because of the hidden relationship between different private attributes. In summary, these results indicate that although using one discriminator in the training process can help in preserving more semantic, it can compromise the effectiveness of learned representation in obscuring attributes POS Tagging Task. In the POS tagging task, results show that DPText achieves the best performance in tagging task (i.e., higher utility) in comparison to other methods that solely use one of the private attribute discriminators. The reason is that presence of age and gender related information in the text can negatively affect the tagging performance due to existing bias. Therefore, DPTEXT is thus more effective in removing information of all private attributes and hidden existing bias in comparison to DPTEXTAGE and DPTEXT-GEN. Removing bias leads to more accurate tagging. Similar to sentiment prediction task, it is observed that DPTEXT-GEN with only gender attribute discriminator is less effective than DPTEXT in terms of hiding private attributes information. DP-TEXTAGE however, has the best results in terms of obscuring age attribute information while it is less effective in terms of hiding gender attribute information. This shows the hidden relationship between different private attributes.

Parameter Analysis. DPText has one important parameter $\alpha$ which controls the contribution from private attribute discriminator $D_P$. The effect of this parameter is investigated by varying it as [0.125, 0.25, 0.5, 1, 2, 4, 8, 16]. ORIGINAL-{AGE/GEN/Loc} shows the results for the corresponding task when the original text representation has been utilized. Results are shown in FIGS. 7A and 7B, and FIGS. 7C and 7D for sentiment prediction and POS tagging, respectively.

Parameter $\alpha$ controls the contribution of private attribute discriminator. However, it is surprisingly observed that in both sentiment prediction and POS tagging tasks with the increase of $\alpha$, the F1 scores for prediction of different private attributes decrease at first up to the point that $\alpha=1$ and then it increases. This means that the private attributes were obscured more accurately at the beginning with the increase of $\alpha$ and less later. Moreover, with the increase of $\alpha$, the accuracy of sentiment prediction task decreases. This shows that increasing the contribution of private attribute discriminator lead to decrease in the utility of resultant text representation. In case of POS tagging, the accuracy first increases and then decreases after α=1. This shows that removing the age and gender attributes related information results in removing the bias from learned text representation and improve the tagging task. However, after α=1 the utility of resultant representation decreases. Those patterns are useful for selecting the value of parameter α in practice Moreover, in both tasks, setting α=0.125 results in an improvement in terms of the amount of hidden private information in comparison to the results of using the original representation. This observation supports the importance of the private attribute discriminator. Another observation is that, after α=1, continuously increasing α degrades the performance of hiding private attributes (i.e., increasing F1 scores) in both sentiment prediction and POS tagging tasks. This is because the model could overfit by increasing α which lead to an inaccurate learned text representation in terms of preserving private attributes and semantic meaning of the text.

Figure 8:
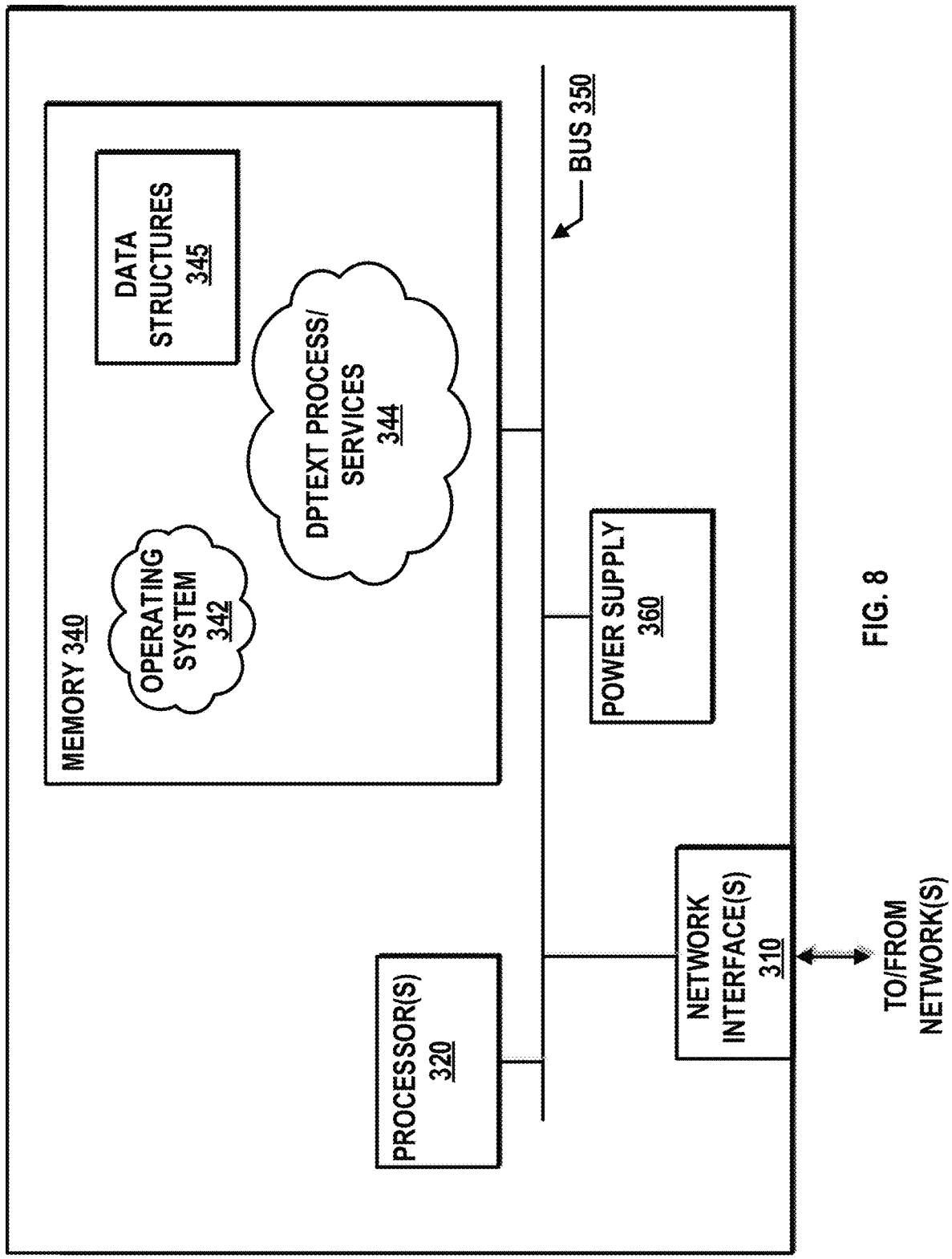
FIG. 8 is a simplified diagram showing an example device for implementation of the framework of FIG. 1.

FIG. 8 is a schematic block diagram of an example device 300 that may be used with one or more embodiments described herein, e.g., as a component of framework 100.

Device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360; however, it is appreciated that the interfaces that support PLC protocols may communicate through power supply 360 and/or may be an integral component coupled to power supply 360.

Memory 340 comprises a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes device 300 by, inter alia, invoking operations in support of software processes and/or services executing on the device. These software processes and/or services may comprise DPText process/services 344, described herein. Note that while DPText process/services 344 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the DPText process 344 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method of generating a modified latent text representation for a document, comprising:
    utilizing a processor in communication with a tangible storage medium storing instructions that are executed by the processor to perform operations comprising:
        generating an initial latent representation representative of text in a document;
        inferring an amount of noise to be added to the initial latent representation by finding a privacy budget value that minimizes a loss between a predicted semantic label and a ground truth semantic label for the initial latent representation and maximizes a loss between a predicted private attribute label and a ground truth private attribute label for the initial latent representation;
        adding the amount of noise to the initial latent text representation to generate the modified latent text representation;
        optimize a set of private attribute discriminator parameters and the privacy budget value that maximize the loss between the predicted private attribute label and the ground truth private attribute label for the initial latent representation;
        generating the predicted private attribute label by applying a classifier to the modified latent representation;
        maximizing a loss between the predicted private attribute label and the ground truth private attribute label; and
        selecting the set of private attribute discriminator classifier parameters associated with the lowest loss value between the predicted private attribute label and the ground truth private attribute label.

2. The method of claim 1, wherein the initial latent representation is generated using an auto-encoder trained to generate the initial latent representation from the text in the document.

3. The method of claim 2, further comprising training the autoencoder by:
    generating an encoded latent representation representative of the text in the document by applying an encoder to the document;
    constructing a reconstructed document including reconstructed text representative of the text in the encoded latent representation by applying a decoder to the encoded latent representation; and
    identifying a plurality of autoencoder parameters that minimize a loss between the text in the document and the reconstructed text in the reconstructed document.

4. The method of claim 1, further comprising:
optimizing a set of semantic discriminator classifier parameters and the privacy budget value that minimize the loss between the predicted semantic label and the ground truth semantic label for the initial latent representation.

5. The method of claim 4, further comprising:
adding a first amount of noise to the initial latent representation to generate the modified latent representation.

6. The method of claim 4, further comprising:
generating the predicted semantic label by applying a second classifier to the modified latent representation;
minimizing a loss between the predicted semantic label and the ground truth semantic label; and
identifying the set of semantic discriminator classifier parameters associated with the lowest loss value between the predicted semantic label and the ground truth semantic label.

7. The method of claim 1, further comprising:
selecting the privacy budget value that is associated with a lowest loss value between the predicted semantic label and the ground truth semantic label and that is associated with a highest loss value between the predicted private attribute label and the ground truth private attribute label.

8. The method of claim 1, wherein the optimization of the set of private attribute discriminator parameters is modeled as a minmax game.

9. The method of claim 1, further comprising:
determining the amount of noise to add based on the privacy budget value by sampling a value r from a uniform distribution such that:

$$s(i) = -\frac{\Delta}{\epsilon} \times \operatorname{sgn}(r)\ln(1 - 2|r|), i = 1, 2, \ldots, d$$

wherein $\epsilon$ is the privacy budget value, $\Delta$ is an $L_1$-sensitivity of the initial latent representation, d is a dimension of the initial latent representation, s is a noise vector and s(i) is the i-th element for noise vector s.

10. The method of claim 1, wherein the step of finding the privacy budget value is iteratively repeated until convergence.

11. The method of claim 10, wherein the process of adding the amount of noise to the initial latent text representation to generate the modified latent text representation runs concurrently with finding the privacy budget value.

12. A computer system for generating a modified latent text representation for a document, comprising:
at least one processor in communication with a memory and operable for execution of a plurality of modules, the plurality of modules including:
an auto-encoder configured to generate an initial latent representation representative of text in a document;
a noise adder module configured to receive the initial latent representation and add an amount of noise to the initial latent representation to generate a modified latent text representation based on a privacy budget value;
a semantic meaning discriminator module configured to optimize a set of semantic discriminator classifier parameters and the privacy budget value such that a loss is minimized between the predicted semantic label and the ground truth semantic label for the initial latent representation; and
a private attribute discriminator module configured to optimize a set of private attribute discriminator parameters and the privacy budget value such that a loss is maximized between the predicted private attribute label and the ground truth private attribute label for the initial latent representation.

13. The computer system of claim 12, wherein the auto-encoder module is configured to:
generate an encoded latent representation representative of the text in the document by applying an encoder to the document;
construct a reconstructed document including reconstructed text representative of the text in the encoded latent representation by applying a decoder to the encoded latent representation; and
identify a plurality of autoencoder parameters that minimize a loss between the text in the document and the reconstructed text in the reconstructed document.

14. The computer system of claim 12, wherein the semantic meaning discriminator module is configured to:
generate the predicted semantic label by applying a first classifier to the modified latent representation;
minimize the loss between the predicted semantic label and the ground truth semantic label; and
identify the set of semantic discriminator classifier parameters associated with the lowest loss value between the predicted semantic label and the ground truth semantic label.

15. The computer system of claim 14, wherein the first classifier is implemented using a recurrent neural network that takes the set of semantic discriminator classifier parameters and the modified latent text representation as input.

16. The computer system of claim 12, wherein the private attribute discriminator module is configured to:
generate the predicted private attribute label by applying a second classifier to the modified latent representation;
maximize a loss between the predicted private attribute label and the ground truth private attribute label; and
select the set of private attribute discriminator classifier parameters associated with the lowest loss value between the predicted private attribute label and the ground truth private attribute label.

17. The computer system of claim 16, wherein the second classifier is implemented using a recurrent neural network that takes the set of private attribute discriminator classifier parameters and the modified latent text representation as input.

18. The computer system of claim 16, wherein the privacy budget value is associated with a lowest loss value between the predicted semantic label and the ground truth semantic label and a highest loss value between the predicted private attribute label and the ground truth private attribute label.

* * * * *